US012547215B2

(12) United States Patent
Oh

(10) Patent No.: US 12,547,215 B2
(45) Date of Patent: Feb. 10, 2026

(54) ELECTRONIC DEVICE INCLUDING FIXING MEMBER

(71) Applicant: SAMSUNG ELECTRONICS CO., LTD., Suwon-si (KR)

(72) Inventor: Donggyu Oh, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 301 days.

(21) Appl. No.: 18/212,335

(22) Filed: Jun. 21, 2023

(65) Prior Publication Data

US 2023/0333601 A1 Oct. 19, 2023

Related U.S. Application Data

(63) Continuation of application No. PCT/KR2022/014410, filed on Sep. 27, 2022.

(30) Foreign Application Priority Data

Oct. 12, 2021 (KR) .................. 10-2021-0135159
Dec. 10, 2021 (KR) .................. 10-2021-0176918

(51) Int. Cl.
*G06F 1/16* (2006.01)
*H04M 1/02* (2006.01)

(52) U.S. Cl.
CPC .......... *G06F 1/1656* (2013.01); *H04M 1/026* (2013.01); *G06F 1/163* (2013.01)

(58) Field of Classification Search
CPC ...... H05K 5/06; H04M 1/026; H04M 1/0264; H04M 1/03; H04M 1/18; G06F 1/163; G06F 1/1656; G04G 17/02
See application file for complete search history.

(56) References Cited

U.S. PATENT DOCUMENTS 9,832,567 B2  11/2017  Zhang et al.
9,939,787 B2   4/2018  Baek et al.
(Continued)

FOREIGN PATENT DOCUMENTS

CN    110166909 A   8/2019
CN    212752629 U   3/2021
(Continued)

OTHER PUBLICATIONS

International Search Report corresponding to Application No. PCT/KR2022/014410; Filing Date Sep. 27, 2022.
(Continued)

*Primary Examiner* — Timothy J Thompson
*Assistant Examiner* — Rhadames Alonzo Miller
(74) *Attorney, Agent, or Firm* — CANTOR COLBURN LLP

(57) ABSTRACT

An electronic device includes a housing including a protrusion protruding in one direction, and an opening portion communicating from the outside to the inside of the electronic device on one surface of the protrusion, an electronic component including a waterproof member to shield the opening portion, and a fixing member including a first surface disposed on an opposite surface to the one surface of the protrusion on which the opening portion is configured, and at least one second surface. The fixing member is disposed such that the waterproof member is forced against the opening portion by the first surface and the at least one second surface by fitting the protrusion and the electronic component between the first surface and the at least one second surface with the electronic component coupled to the protrusion portion such that the waterproof member shields the opening portion.

20 Claims, 15 Drawing Sheets

(56) References Cited

U.S. PATENT DOCUMENTS

| | | | |
|---|---|---|---|
| 10,165,694 B1 | 12/2018 | Werner et al. | |
| 10,698,367 B2 | 6/2020 | Park et al. | |
| 10,911,848 B2 | 2/2021 | Yoon et al. | |
| 2011/0048755 A1* | 3/2011 | Su .................... | H05K 5/0243 |
| | | | 72/352 |
| 2014/0177151 A1* | 6/2014 | Manda ................ | G06F 1/1633 |
| | | | 361/679.56 |
| 2015/0112468 A1 | 4/2015 | Rudnick, III et al. | |
| 2017/0051769 A1 | 2/2017 | Hilario et al. | |
| 2020/0198195 A1* | 6/2020 | Ren ...................... | H04M 1/02 |
| 2021/0088979 A1 | 3/2021 | Son et al. | |
| 2024/0305706 A1* | 9/2024 | Xue .................... | H04M 1/035 |

FOREIGN PATENT DOCUMENTS

| | | | | |
|---|---|---|---|---|
| CN | 213581756 U | 6/2021 | | |
| CN | 213906864 U | 8/2021 | | |
| CN | 115708360 A | 2/2023 | | |
| JP | H0678890 U | 11/1994 | | |
| KR | 20140137799 A | 12/2014 | | |
| KR | 20190021056 A | 3/2019 | | |
| KR | 20190026461 A1 | 3/2019 | | |
| KR | 20200009593 A | 1/2020 | | |
| KR | 102204109 B1 * | 1/2021 | ........... | G06F 1/1605 |
| WO | WO-2013011676 A1 * | 1/2013 | ............. | H05K 5/069 |

OTHER PUBLICATIONS

Extended European Search Report Issued In EP Application No. 22881252.5-1218, Mail Date Oct. 10, 2024, 10 Pages.

\* cited by examiner

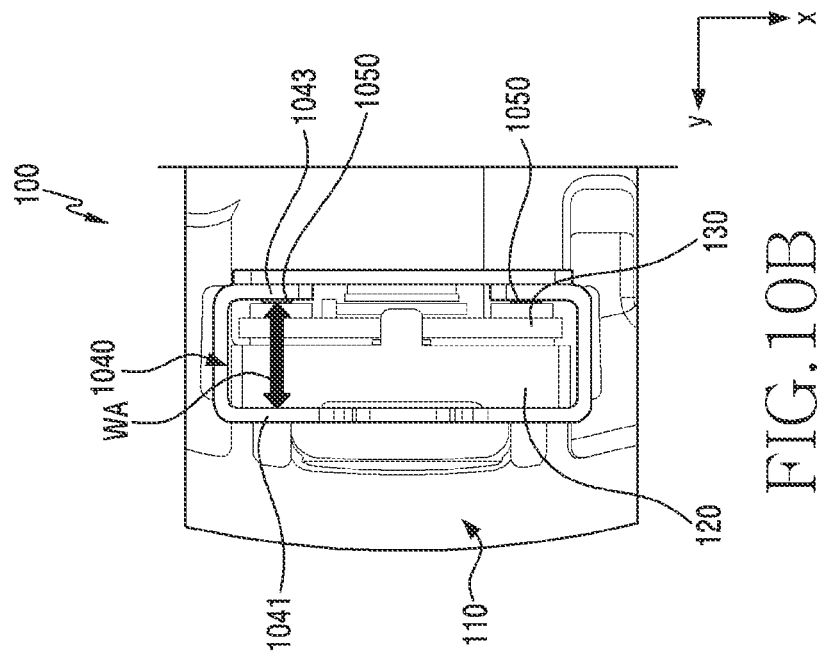
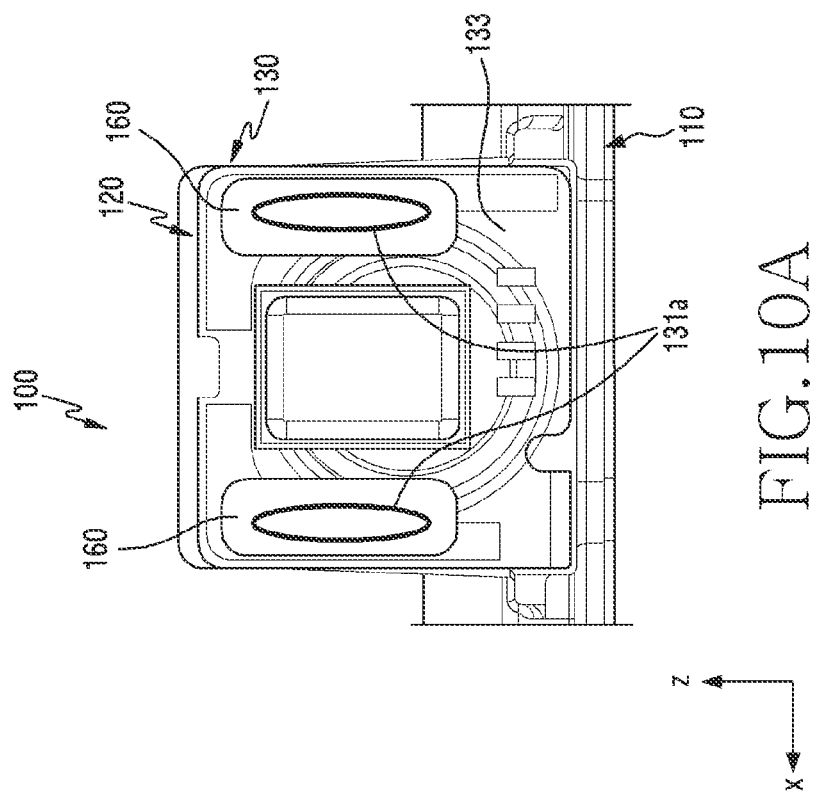
FIG.10A
FIG.10B

ELECTRONIC DEVICE INCLUDING FIXING MEMBER

CROSS-REFERENCE TO RELATED APPLICATIONS

This application is a continuation application, claiming priority under § 365(c), of International Application No. PCT/KR2022/014410, Sep. 27, 2022, which is based on and claims the benefit of Korean patent application number 10-2021-0135159 filed on Oct. 12, 2021, in the Korean Intellectual Property Office and of Korean patent application number 10-2021-0176918, filed on Dec. 10, 2021, in the Korean Intellectual Property Office, the disclosures of which are incorporated by reference herein in their entireties.

BACKGROUND

Field

Various embodiments disclosed herein relate to an electronic device including a fixing member.

Description of Related Art

An electronic device such as a smartphone may include various electronic components, such as a camera, a microphone, a speaker, or a receiver, inside the electronic device in order to provide various functions. The electronic device may include at least one hole in order to discharge sounds output from an acoustic component such as a speaker or a receiver to the outside of the electronic device, or to receive voices or sounds from the outside of the electronic device. In order to prevent inflow of a material (for example, air or water) into the electronic device from outside the electronic device through the at least one hole, the electronic device may include a waterproof structure and a fixing structure capable of fixing the waterproof structure in place relative to the at least one hole.

SUMMARY

In order to fix the waterproof structure in place relative to the at least one hole, the fixing structure may further include an additional fixing structure such as a screw structure or a bottom groove structure. Production or fabrication of the additional fixing structure may require an additional process such as a CNC machining process. This may increase the production cost and the production time of the additional fixing structure and the waterproof structure overall. In addition, the fixing structure may have a dimensional error generated during the course of the additional process. The fixing structure may have degraded fixing power if a tolerance is generated between the waterproof structure and the fixing structure by the dimensional error.

An electronic device according to various embodiments of the disclosure may include a housing including a protrusion portion protruding in one direction, and an opening portion communicating from an outside of the electronic device to an inside of the electronic device on one surface of the protrusion portion, an electronic component including a waterproof member disposed to shield the opening portion, and a fixing member including a first surface disposed on an opposite surface to the one surface of the protrusion portion on which the opening portion is configured, and at least one second surface extending from one side of the first surface to face the first surface, wherein the fixing member is disposed such that the waterproof member is forced against the opening portion by the first surface and the at least one second surface, by fitting the protrusion portion and the electronic component between the first surface and the at least one second surface in a state in which the electronic component is coupled to the protrusion portion such that the waterproof member shields the opening portion.

An electronic device according to various embodiments of the disclosure may include a housing including a protrusion portion protruding in one direction, and an opening portion communicating from an outside of the electronic device to an inside of the electronic device on one surface of the protrusion portion, an electronic component including a waterproof member disposed to shield the opening portion, and a fixing member which includes a first surface disposed on an opposite surface to the one surface of the protrusion portion on which the opening portion is configured, and a second surface extending from the first surface and disposed on an opposite surface to a surface on which the waterproof member of the electronic component is disposed, to face the first surface, and of which at least a partial cross-section forms a closed figure including the first surface and the second surface, wherein the fixing member is disposed such that the waterproof member is forced against the opening portion by the first surface and the second surface, by fitting the protrusion portion and the electronic component inside the closed figure in a coupled state.

Various embodiments disclosed herein may provide an electronic device including a fixing structure, wherein the same includes an insertion structure such that a waterproof structure can be fixed against a force from outside the electronic device (for example, pressure from a material (for example, air or water) introduced into the electronic device from outside the electronic device) or external impacts.

In addition, various embodiments disclosed herein may provide an electronic device including a fixing member having improved fixing power without including an additional fixing structure.

Various other advantageous effects identified explicitly or implicitly through the disclosure may be provided.

BRIEF DESCRIPTION OF THE DRAWINGS

FIGS. 10A and 10B are plan views illustrating an electronic device in which an electronic component is coupled to a protrusion portion, and a plan view of an electronic device to which a fixing member is coupled, according to an embodiment;

In relation to the description of drawings, the same or similar reference numerals may be used for the same or similar components.

DETAILED DESCRIPTION

Figure 1A:
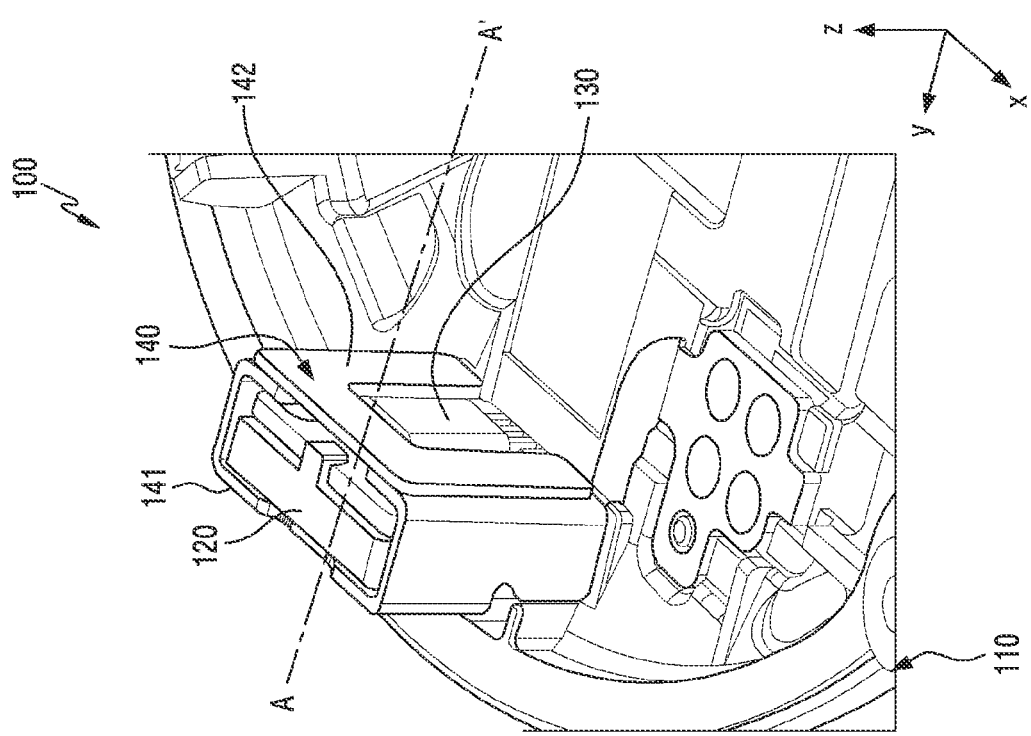
FIGS. 1A and 1B are perspective and cross-sectional views illustrating an electronic device to which a fixing member is coupled in a state in which an electronic component is coupled to a protrusion portion, according to an embodiment.

Hereinafter, various embodiments of the disclosure will be described with reference to the accompanying drawings. However, it should be appreciated that they are not intended to limit the disclosure to particular embodiments, and the disclosure should be construed to cover various modifications, equivalents, and/or alternatives of the embodiments of the disclosure.

An electronic device according to various embodiments of the disclosure may include at least one of, for example, a smartphone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., watch, ring, bracelet, anklet, necklace, glasses, contact lens, or head-mounted device (HMD)), a fabric or clothing-integrated type (e.g., electronic clothing), a body-mounted type (e.g., skin pad, or tattoo), and a bio-implantable type (e.g., implantable circuit).

In some embodiments, the electronic device may include at least one of, for example, a television, a digital video disk (DVD) player, an audio, a refrigerator, an air conditioner, a vacuum cleaner, an oven, a microwave oven, a washing machine, an air purifier, a set-top box, a home automation control panel, a security control panel, a TV box, a game console, an electronic dictionary, an electronic key, a camcorder, and an electronic photo frame.

In other embodiments, the electronic device may include at least one of various medical devices (e.g., various portable medical measuring devices (blood glucose monitoring device, heart rate monitoring device, blood pressure measuring device, body temperature measuring device, etc.), magnetic resonance angiography (MRA), magnetic resonance imaging (MRI), computed tomography (CT) machine, ultrasonic machine, etc.), a navigation device, a global positioning system (GPS) receiver, an event data recorder (EDR), a flight data recorder (FDR), a vehicle infotainment device, electronic equipment for a ship (e.g., ship navigation device, gyro-compass, etc.), avionics, a security device, an automobile head unit, a home or industrial robot, an automatic teller's machine (ATM) in banks, point of sales (POS) in a shop, or Internet of things devices (e.g., light bulb, various sensors, electric or gas meter, sprinkler device, fire alarm, thermostat, streetlamp, toaster, sporting goods, hot water tank, heater, boiler, etc.).

According to some embodiments, the electronic device may include at least one of a part of furniture or a building/structure, an electronic board, an electronic signature receiving device, a projector, and various kinds of measuring instruments (e.g., water meter, electric meter, gas meter, radio wave meter, etc.). In various embodiments, the electronic device may be a combination of one or more of the aforementioned various devices. According to some embodiments, the electronic device may a flexible electronic device. Further, the electronic device according to an embodiment of the disclosure is not limited to the aforementioned devices, and may include a new electronic device according to the development of technology.

Figure 1B:
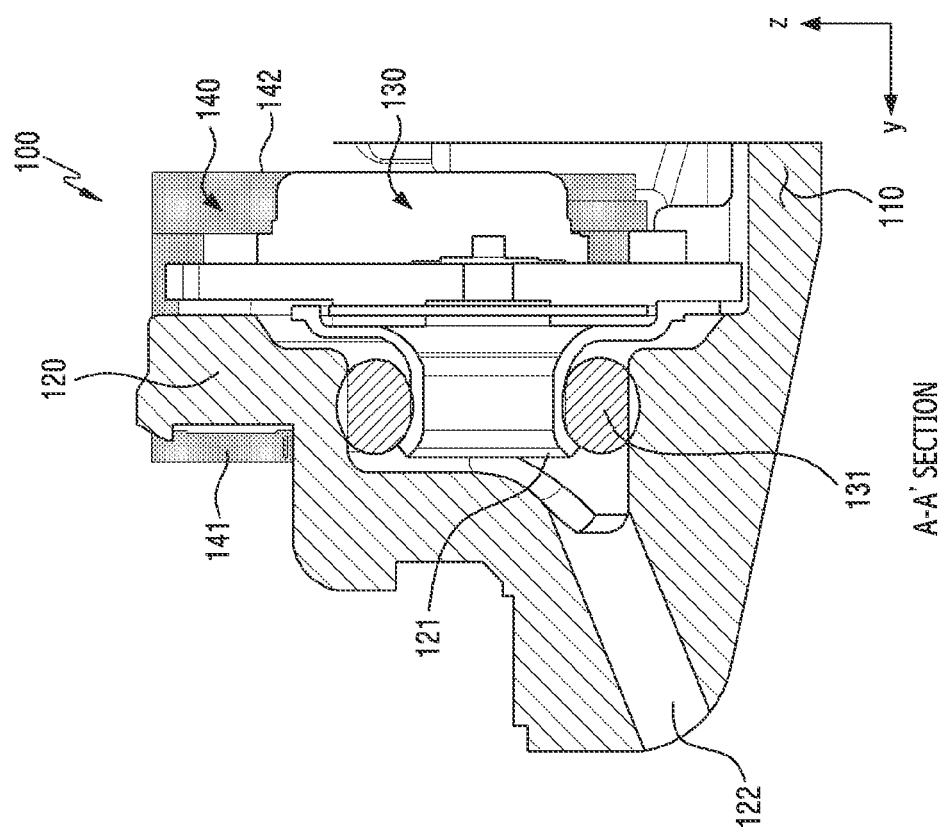

FIGS. 1A and 1B are perspective and cross-sectional views illustrating an electronic device 100 to which a fixing member 140 is coupled in a state in which an electronic component 130 is coupled to a protrusion portion 120, according to an embodiment.

Referring to FIGS. 1A and 1B, an electronic device 100 according to an embodiment may include a housing 110 including a protrusion portion 120 protruding in one direction (for example, the +z-axis direction), an electronic component 130 coupled to at least a part of the protrusion portion 120, and a fixing member 140 disposed on at least a part of outer parts of the protrusion portion 120 and the electronic component 130 in a state in which the electronic component 130 is coupled to the protrusion portion 120. However, the configuration of the electronic device 100 is not limited thereto. For example, the electronic device 100 may omit at least one component among the above-described components, or further include at least one other component. For example, the electronic device 100 may further include a protection member disposed between the electronic component 130 and the fixing member 140.

According to an embodiment, the electronic component 130 may be a component requiring a waterproof structure in order to implement a waterproof function. For example, since a component which outputs or receives a sound is required to be disposed on a path through which the sound can be transmitted between the outside and the component, a structure for blocking a liquid flowing in from the outside may be required. The electronic component 130 may include at least one of a sound module or a camera module. However, the disclosure is not limited thereto.

According to an embodiment, the protrusion portion 120 may be integrally configured with the housing 110. However, the disclosure is not limited thereto. The protrusion portion 120 may be configured as a separate member from the housing 110.

Referring to the cross-sectional view (A-A' SECTION) of FIG. 1B, the housing 110 according to an embodiment may include at least one opening portion 121 communicating from the outside of the electronic device 100 to the inside of the electronic device 100. According to an embodiment, the at least one opening portion 121 may be connected to or engaged with a through-hole 122 extending through the housing 110 from the outside of the electronic device 100 to the inside of the electronic device 100. Through the through-hole 122, a material may be introduced into the inside of the electronic device 100 from the outside of the electronic device 100. For example, air or water outside the electronic device 100 may be introduced into the inside of the electronic device 100 through the through hole 122.

According to an embodiment, when the electronic component 130 includes the sound module, a sound of the sound module may be emitted to the outside of the electronic device 100 through the through-hole 122, or may be introduced into the inside of the electronic device 100. For example, when the electronic component 130 includes a speaker, a sound emitted from the speaker may move through the through-hole 122 through the opening portion 121 to be emitted to the outside of the electronic device 100. In another embodiment, when the electronic component 130 includes a microphone, an external sound of the electronic device 100 may move through the through-hole 122 to be introduced into the inside of the electronic device 100 through the opening portion 121. However, the disclosure is not limited thereto.

According to an embodiment, in order to prevent a material (e.g., air or water) introduced through the through-hole 122 from being introduced into the inside of the electronic device 100 through the at least one opening portion 121, the electronic device 100 may include at least one waterproof member 131. For example, referring to FIG. 1, the electronic component 130 of the electronic device 100 may include the at least one waterproof member 131. The at least one waterproof member 131 may be integrally configured with the electronic component 130. However, the disclosure is not limited thereto. The at least one waterproof member 131 may be configured as a separate member from the electronic component 130.

According to an embodiment, at least a part of the electronic component 130 may shield the opening portion 121. For example, the at least one waterproof member 131 is inserted into the opening portion 121, so that the electronic component 130 may shield the opening portion 121. A region in close contact with an inner surface of the opening portion 121 of the waterproof member 131 may seal between the waterproof member 131 and the inner surface of the opening portion 121 while being pressed between the waterproof member 131 and the inner surface of the opening portion 121 by an elastic force. The at least one waterproof member 131 may seal between the waterproof member 131 and the inner surface of the opening portion 121, to prevent a material (e.g., air or water) introduced through the through-hole 122 from being introduced into the inside of the electronic device 100 through the at least one opening portion 121.

According to an embodiment, the fixing member 140 may be disposed on at least a part of outer parts of the protrusion portion 120 and the electronic component 130 coupled to the protrusion portion 120. The fixing member 140 is fitted in a state in which the protrusion portion 120 and the electronic component 130 are coupled to each other, so that the electronic component 130 may be fixed so as not to be separated from the protrusion portion 120. For example, the fixing member 140 may be disposed to surround at least a part of the outer parts of the protrusion portion 120 and the electronic component 130 coupled to the protrusion portion 120 in a state in which the waterproof member 131 shields the opening portion 121. According to an embodiment, the fixing member 140 may include a first surface 141 disposed on an opposite surface to one surface of the protrusion portion 120 on which the opening portion 121 is configured, and a second surface 142 facing the first surface 141 and disposed on an opposite surface to one surface of the electronic component 130 on which the waterproof member 131 is disposed. The protrusion portion 120 and the electronic component 130 coupled to the protrusion portion 120 may be fit between the first surface 141 and the second surface 142. The shape of the fixing member 140 may be implemented in various shapes in which the protrusion portion 120 and the electronic component 130 can be fit in the inside thereof. The fixing member 140 may be configured to have another shape corresponding to the shapes of the protrusion portion 120 and the electronic component 130 other than the shape shown herein.

According to an embodiment, the fixing member 140 may fix the electronic component 130 in a state in which the electronic component 130 is coupled to the protrusion portion 120. The fixing member 140 may prevent the waterproof member 131 or the electronic component 130 including the waterproof member 131 from moving (for example, in the −y-axis direction) in a state in which the waterproof member 131 of the electronic component 130 is disposed at the opening portion 121 of the protrusion portion 120. For example, the fixing member 140 may prevent the waterproof member 131 from being separated from the opening portion 121 by a pressure (for example, an air pressure or water pressure) generated as a material (e.g., air or water) outside the electronic device 100 is introduced through the through-hole 122. The fixing member 140 may prevent the waterproof member 131 from being separated from the opening portion 121 to prevent at least one material (for example, air or water) from being introduced into the inside (for example, through the through-hole 122 and the opening portion 121) of the electronic device 100 from the outside of the electronic device 100.

According to an embodiment, the fixing member 140 may cause the electronic component 130 to be in close contact with the protrusion portion 120. For example, the fixing member 140 may cause the waterproof member 131 to be in close contact with the opening portion 121. The protrusion portion 120 and the electronic component 130 coupled to the protrusion portion 120 are fitted between the first surface 141 disposed on the opposite surface to the one surface of the protrusion portion 120 on which the opening portion 121 is configured, and the second surface 142 facing the first surface 141 and disposed on the opposite surface to the one surface of the electronic component 130 on which the waterproof member 131 is disposed, so that the waterproof member 131 may be in close contact with the opening portion 121. Accordingly, the fixing member 140 may improve the waterproof performance of the electronic device 100.

According to an embodiment, the fixing member 140 may include a hard material. For example, the fixing member 140 may include a metal (e.g., steel or stainless steel (SUS)). However, the disclosure is not limited thereto.

Figure 2A:
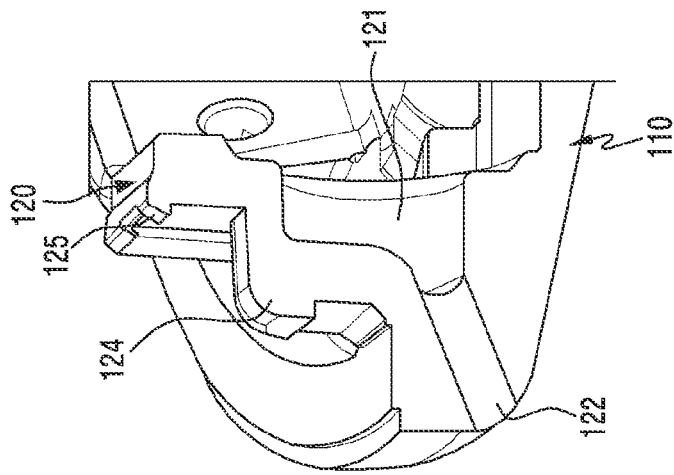
FIGS. 2A, 2B and 2C are perspective views and a cross-sectional view illustrating a housing including a protrusion portion according to an embodiment.
Figure 2B:
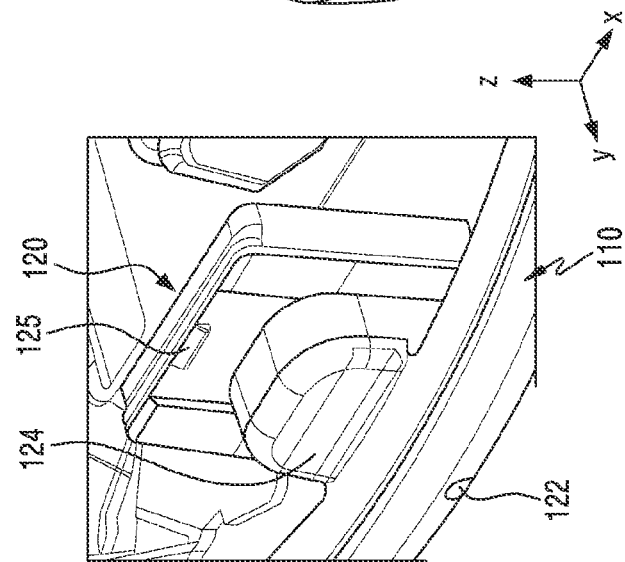
Figure 2C:
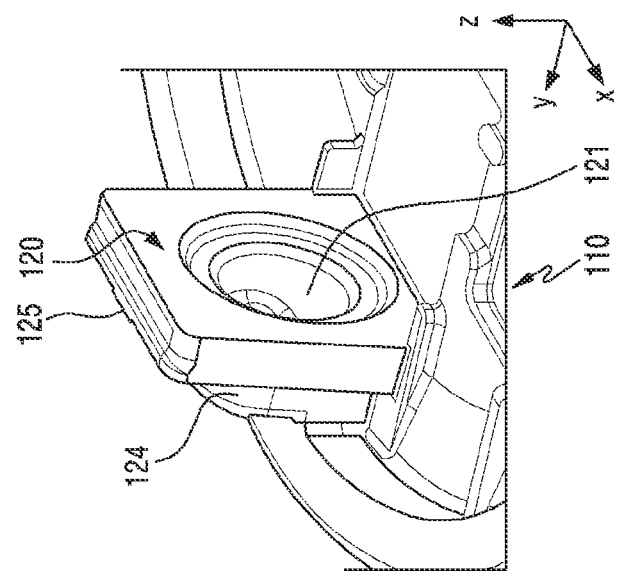

FIGS. 2A, 2B and 2C are perspective views and a cross-sectional view illustrating a housing 110 including a protrusion portion 120 according to an embodiment.

The housing 110 and the protrusion portion 120 may be referred to as being the same features as the housing 110 and the protrusion portion 120 of FIGS. 1A and 1B. The same reference numerals are used for the same or substantially the same components as those described above, and a redundant description will be omitted.

Referring to the case of FIG. 2A, the housing 110 according to an embodiment may include the protrusion portion 120 including an opening portion 121 on one surface thereof. For example, the opening portion 121 may be disposed on a side surface (for example, the −y-axis direction) of the protrusion portion 120. The opening portion 121 may be opened in a direction (for example, in the −y-axis direction) from the outside of the electronic device 100 toward the inside of the electronic device 100. For example, referring to the case of FIG. 2C, the opening portion 121 may be opened in a direction in which a through-hole 122 extends through the housing 110 so that the through-hole 122 and the opening portion 121 form a continuous opening. However, the disclosure is not limited thereto.

According to an embodiment, the opening portion 121 may have a circular shape. However, the disclosure is not limited thereto. According to an embodiment, at least a part of a surface of the opening portion 121 in contact with a waterproof member (e.g., the waterproof member 131 of FIG. 1) may be a waterproof surface. For example, at least a part of the surface of the opening portion 121 in contact with the waterproof member 131 may be mirror-finished. However, the disclosure is not limited thereto.

According to an embodiment, the housing 110 may be manufactured via injection molding using a mold. For example, the protrusion portion 120 may be manufactured integrally with the housing 110 via injection molding using a mold. According to an embodiment, the through-hole 122 may be configured by using CNC machining. However, the disclosure is not limited thereto.

According to an embodiment, the protrusion portion 120 may include at least one protrusion structure 124 protruding in one direction (for example, in the +y-axis direction). Referring to FIG. 2, the at least one protrusion structure 124 may be disposed on one side surface of the protrusion portion 120. For example, the protrusion structure 124 may protrude from an opposite surface to a surface of the protrusion portion 120 on which the opening portion 121 is disposed. The protrusion structure 124 may be a structure disposed as the opening portion 121 is disposed in the protrusion portion 120 in a direction (for example, in the +y-axis direction) toward the outside of the electronic device 100. However, the structure of the protrusion portion 120 is not limited thereto. In another example, the protrusion portion 120 may further include at least one protrusion structure protruding from a surface on which the opening portion 121 is disposed in a direction (for example, the −y-axis direction) in which the opening portion 121 is opened.

Referring to the cases of FIGS. 2B and 2C, the protrusion portion 120 according to an embodiment may include at least one catch member 125. The at least one catch member 125 may be disposed on one edge of the protrusion portion 120. However, the disclosure is not limited thereto. The at least one catch member 125 may be disposed on an opposite surface to the surface on which the opening portion 121 is disposed.

According to an embodiment, as in the perspective view of FIG. 1A, when a fixing member (e.g., the fixing member 140 of FIG. 1) is coupled in a state in which an electronic component (e.g., the electronic component 130 of FIG. 1) is coupled to a protrusion portion (e.g., the protrusion portion 120 of FIG. 2), the at least one catch member 125 of FIGS. 2B and 2C may fix the fixing member 140 relative to the protrusion portion 120. For example, the at least one catch member 125 may prevent the coupled fixing member 140 from moving or being separated (for example, in the +z-axis direction) from the protrusion portion 120.

According to an embodiment, the at least one catch member 125 may include a protrusion structure protruding toward a direction that is different from a direction (for example, the −z-axis direction) in which the fixing member 140 is fitted. For example, referring to the cases of FIGS. 2B and 2C, the at least one catch member 125 may protrude in an opposite direction (for example, in the +y-axis direction) to a direction in which the opening portion 121 is opened. According to an embodiment, the catch member 125 may have a hook shape.

Figure 3:
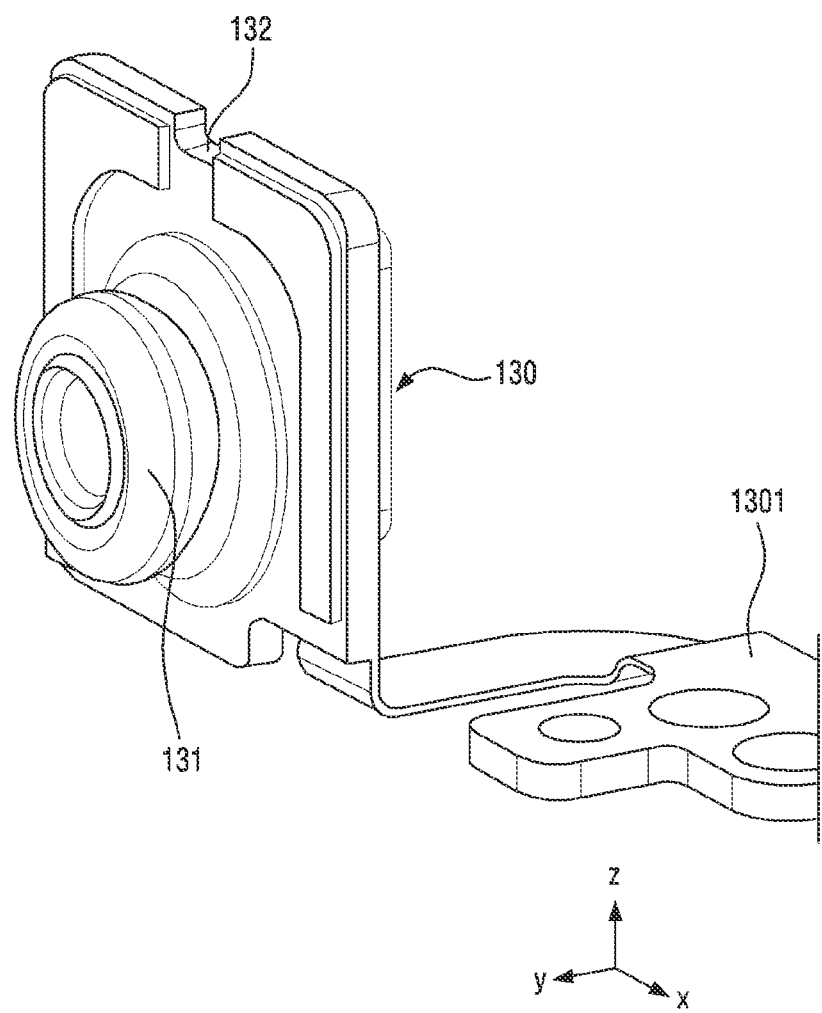
FIG. 3 is a perspective view illustrating an electronic component including a waterproof member according to an embodiment.

FIG. 3 is a perspective view illustrating an electronic component 130 including a waterproof member 131 according to an embodiment.

The electronic component 130 and the waterproof member 131 may be referred to as being the same features as the electronic component 130 and the waterproof member 131 of FIGS. 1A and 1B. The same reference numerals are used for the same or substantially the same components as those described above.

Referring to FIG. 3, the waterproof member 131 according to an embodiment may protrude from one surface of the electronic component 130 in one direction (for example, in the +y-axis direction). According to an embodiment, the waterproof member 131 may have a circular shape including a through-hole. For example, the waterproof member 131 may have a toroidal, tube or O-ring shape. However, the disclosure is not limited thereto. In various embodiments, the waterproof member 131 may have a shape corresponding to the shape of an opening portion 121 to be able to shield the opening portion 121. The waterproof member 131 has a shape corresponding to the shape of the opening portion 121, so that the waterproof member 131 may block the introduction of an external material (for example, a foreign material, air, or water) of the electronic device 100 through the opening portion 121.

According to an embodiment, the waterproof member 131 may include at least one of rubber or silicone. However, the waterproof member 131 is not limited to a rubber or silicone material, and may be made of various materials having elasticity such as urethane. According to another embodiment, the waterproof member 131 may be made of a fluoro rubber or Teflon™ material.

According to an embodiment, the electronic component 130 may include at least one groove 132 at one edge thereof. For example, referring to FIG. 3, the electronic component 130 may include a groove 132 that is concave in one direction (for example, the −z-axis direction) at an upper end edge thereof. The groove 132 may receive at least one protrusion structure (described later in FIG. 4) that is configured as a protrusion portion (e.g., the protrusion portion 120 of FIGS. 2A, 2B and 2C) that protrudes into the concave groove 132.

According to an embodiment, the electronic component 130 may include at least one connector 1301. The electronic component 130 may be electrically connected to a printed circuit board of an electronic device (e.g., the electronic device 100 of FIG. 1) by the at least one connector 1301.

According to an embodiment, a surface on which the waterproof member 131 of the electronic component 130 is disposed may include an adhesive member. For example, a tape or a bond may be disposed on the surface on which the waterproof member 131 of the electronic component 130 is disposed. The electronic component 130 may be primarily fixed to the protrusion portion 120 by using the adhesive member. The electronic component 130 may be secondarily further fixed to the protrusion portion 120 by a fixing member (e.g., the fixing member 140 of FIGS. 1A and 1B).

Figure 4:
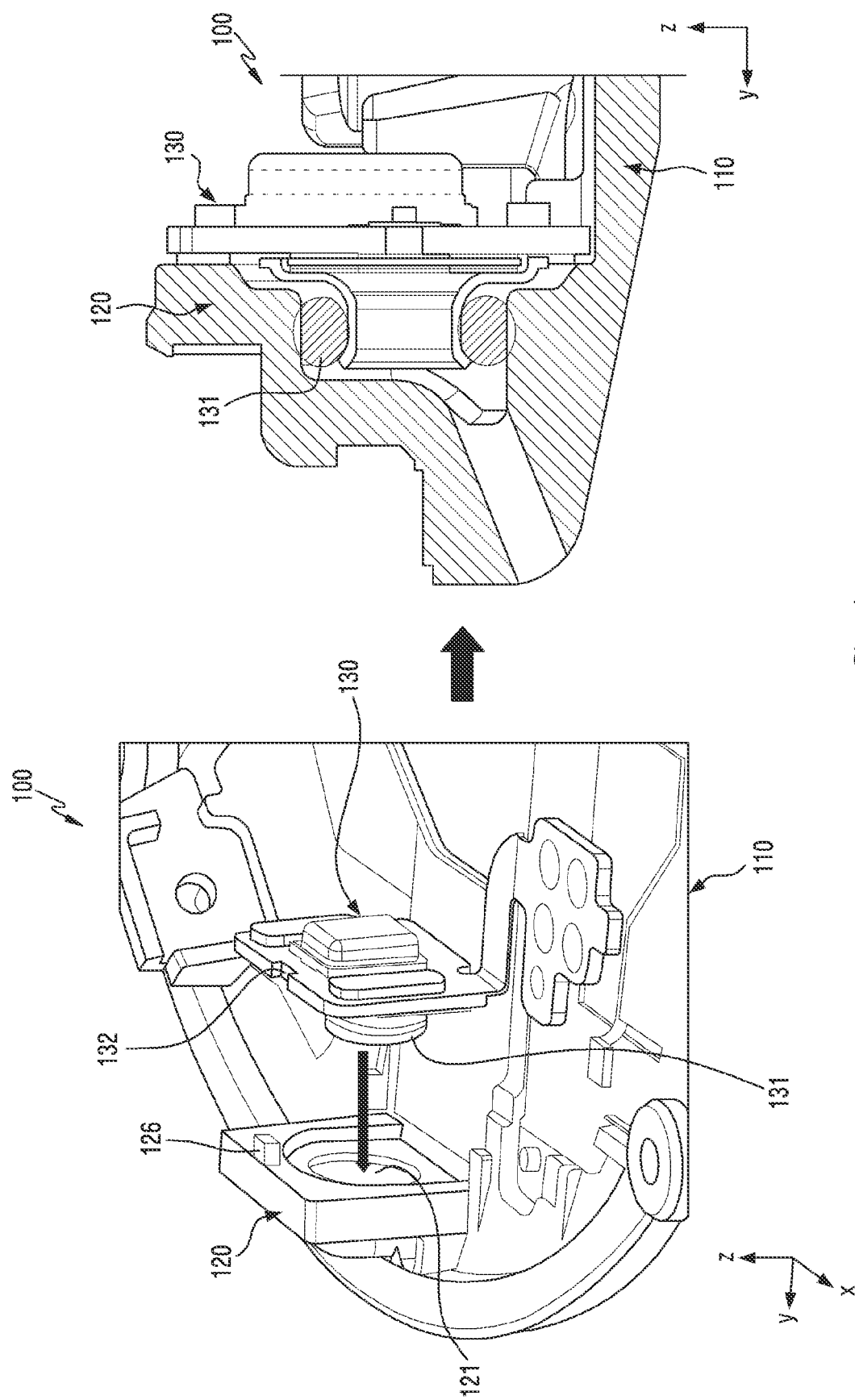
FIG. 4 is a combination of a perspective view illustrating a process in which an electronic component is coupled to a protrusion portion and a cross-sectional view of an electronic device in which the electronic component is coupled to the protrusion portion according to an embodiment.

FIG. 4 is a combination of a perspective view illustrating a process in which an electronic component 130 is coupled to a protrusion portion 120 and a cross-sectional view of an electronic device 100 in which the electronic component 130 is coupled to the protrusion portion 120 according to an embodiment.

The electronic device 100 and components thereof (for example, a housing 110, a protrusion portion 120, and an electronic component 130) may be referred to as being the same features as the electronic device 100 and the components of FIGS. 1A-3 (for example, the housing 110, the protrusion portion 120, and the electronic component 130). The same reference numerals are used for the same or the substantially same components as those described above, and a redundant description will be omitted.

According to an embodiment, the electronic component 130 may be coupled to the protrusion portion 120. Referring to FIG. 4, a waterproof member 131 is inserted into an opening portion 121 of the protrusion portion 120 so that the electronic component 130 may be coupled to the protrusion portion 120.

According to an embodiment, the protrusion portion 120 may include at least one protrusion structure 126. For example, the at least one protrusion structure 126 may be disposed at an upper end of one surface of the protrusion portion 120 on which the opening portion 121 is disposed. The at least one protrusion structure 126 may protrude in a direction (for example, the −y-axis direction) in which the opening portion 121 is opened. However, the shape of the protrusion structure 126 is not limited thereto. According to an embodiment, the protrusion structure 126 may include at least one catch member such as a hook shape at one end thereof.

According to an embodiment, when the electronic component 130 is disposed on the protrusion portion 120 such that the waterproof member 131 is inserted into the opening portion 121, the at least one protrusion structure 126 may be received in at least one groove 132 of the electronic component 130. The at least one protrusion structure 126 may be received in the at least one groove 132 to fix the electronic component 130. For example, the at least one protrusion structure 126 may be received in the at least one groove 132 to prevent the electronic component 130 from moving or being separated (for example, in the +z-axis direction).

Figure 5A:
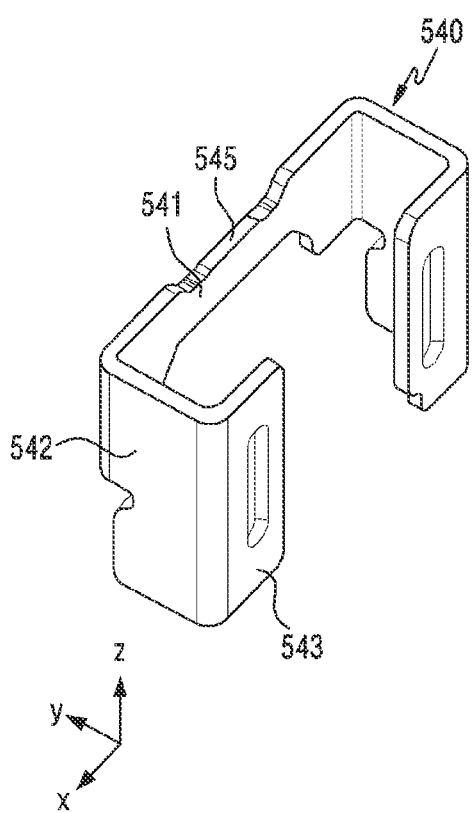
FIGS. 5A and 5B are perspective views illustrating a fixing member according to an embodiment.
Figure 5B:
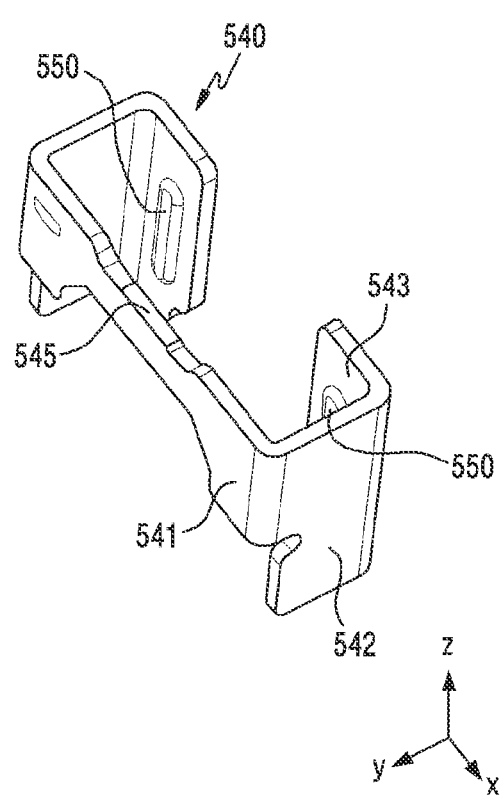

FIGS. 5A and 5B are perspective views illustrating a fixing member 540 according to an embodiment.

The fixing member 540 may be referred to as being the same feature as the fixing member 140 of FIG. 1. For the same or substantially the same content as the above-described content, a redundant description will be omitted.

According to an embodiment, the fixing member 540 may include a first surface 541 and a second surface 543 extending from one side of the first surface 541 and facing the first surface 541. However, the configuration of the fixing member 540 is not limited thereto. For example, the fixing member 540 may include at least one side surface 542 disposed between the first surface 541 and the second surface 543. The at least one side surface 542 may be disposed to face a direction substantially perpendicular to the first surface 541 and the second surface 543. That is, at least one second surface 543 may be substantially perpendicular to the at least one side surface 542 and disposed substantially parallel to the first surface 541. However, the shape of the fixing member 540 is for coupling at least a part (e.g., the protrusion portion 120 of FIG. 1) of a housing and an electronic component (e.g., the electronic component 130 of FIG. 1). Accordingly, the shape of the fixing member 540 may be differently configured depending on at least one of the shape of the housing or the shape of the electronic component. The fixing member 540 may include a space configured by at least one of the first surface 541, the second surface 543 and the side surface 542.

According to an embodiment, the at least one side surface 542 may extend from one side of the first surface 541 and be bent in one direction (for example, the −y-axis direction). The at least one second surface 543 may extend from one side of the at least one side surface 542 and be bent in one direction (for example, the +x-axis or −x-axis direction). However, the disclosure is not limited thereto.

According to an embodiment, the fixing member 540 may include at least one protuberant portion 550 disposed on at least one interior facing surface thereof in a direction facing toward the inside (or a space configured by at least one first surface, second surface 543, and side surface 542) of the fixing member 540. For example, the at least one second surface 543 of the fixing member 540 may include the at least one protuberant portion 550 disposed in a direction (for example, the +y-axis direction) facing toward the inside of the fixing member 540. According to an embodiment, the protuberant portion 550 may refer to the shape of a protrusion portion protruding in one direction. The protuberant portion 550 may implement an interference fit when the fixing member 540 is fitted in the electronic component and a part of the housing of the electronic device to cause the electronic component to be in close contact with the housing. According to another embodiment, the protuberant portion 550 may be configured to have another shape. For example, at least a part of the second surface may be configured to have a shape in which a distance to the first surface is gradually changed.

According to an embodiment, the fixing member 540 may include at least one reception structure for receiving the at least one catch member 125 of FIG. 2. For example, at least a part of the first surface 541 of the fixing member 540 may include at least one groove 545 concavely configured in an opposite direction (for example, the −z-axis direction) to a direction in which a protrusion portion (for example, the protrusion portion 120 of FIG. 2) protrudes. The at least one catch member 125 may be received in the at least one groove 545 to fix the fixing member 540.

According to an embodiment, the fixing member 540 may be configured to correspond to the shape of at least a part of the protrusion portion 120 in a state in which the protrusion portion 120 and the electronic component are fitted. Referring to FIG. 2, the protrusion portion 120 may include a protrusion structure 124 protruding from an opposite surface to one surface on which a waterproof member (e.g., the waterproof member 131 of FIG. 1) is disposed. The first surface 541 of the fixing member 540 may have a shape corresponding to at least a part of the protrusion structure 124 in a state in which the protrusion portion 120 and the electronic component 130 are fitted. For example, referring to FIG. 5, the first surface 541 may include a groove that is concavely configured in an opposite direction (for example, the +z-axis direction) to a direction in which the fixing member 540 is fitted. However, the shape of the fixing member 1140 is not limited thereto.

Figure 6:
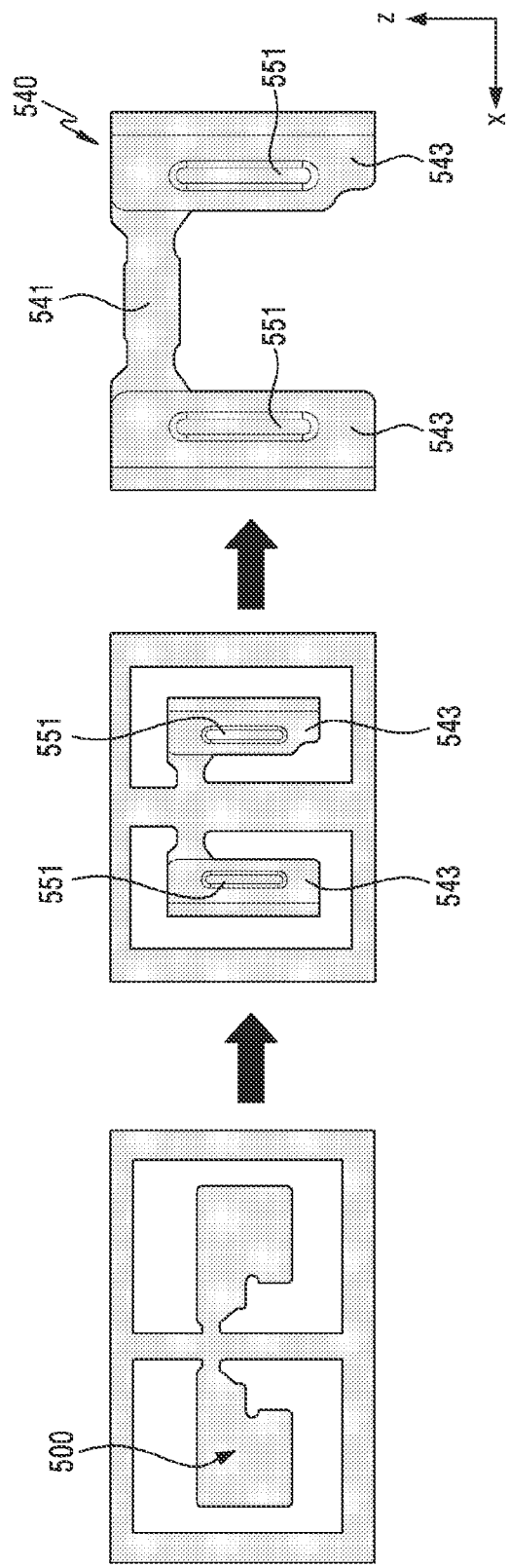
FIG. 6 is a combination of plan views illustrating a process of manufacturing a fixing member according to an embodiment.

FIG. 6 is a combination of plan views illustrating a process of manufacturing a fixing member 540 according to an embodiment.

The fixing member 540 may be referred to as the same feature as the fixing member 140 of FIG. 1 and the fixing member 540 of FIG. 5. For components that are the same or substantially the same as those described above, a redundant description will be omitted.

According to an embodiment, the process of manufacturing the fixing member 540 may include a press working process (case of FIG. 6A), a bending process (case of FIG. 6B) and a bridge punching process (case of FIG. 6C).

However, the process of manufacturing the fixing member 540 is not limited thereto. For example, the process of manufacturing the fixing member 540 may omit at least one process among the above-described processes or may further include at least one other process. For example, the process of manufacturing the fixing member 540 may further include at least one of a processing process of a protuberant portion (e.g., the protuberant portion 550 of FIG. 5) or a barrel process of processing a corner portion of the fixing member 540.

According to an embodiment, in the press working process (case of FIG. 6A), a raw material 500 serving as a material of the fixing member 540 may be processed in an unfolded form. For example, the raw material 500 may be processed to be flatly formed from a first surface 541 to a second surface 543. According to an embodiment, the raw material 500 may be processed into a flat form by using a press machine. According to an embodiment, the press working process may include a process of cutting at least a part of the raw material 500. The process of cutting at least a part of the raw material 500 may include a process of forming a bridge in the center (for example, the center of the first surface 541) of the raw material 500. However, the disclosure is not limited thereto.

According to an embodiment, in the bending process (case of FIG. 6B), at least a part of a member processed in the press working process may be bent. For example, a region between the first surface 541 and the second surface 543 may be bent at least once such that at least one second surface 543 of the fixing member 540 faces the first surface 541.

According to an embodiment, in the protuberant portion processing process, at least one protuberant portion (e.g., the protuberant portion 550 of FIG. 5) may be disposed on the fixing member 540. For example, in the protuberant portion processing process, the at least one protuberant portion 550 protruding in a direction toward the first surface 541 may be disposed on the at least one second surface 543 of the fixing member 540. According to an embodiment, the at least one protuberant portion 550 may be configured by using a punching process. When the at least one protuberant portion 550 is configured by using the punching process, the at least one second surface 543 may include at least one recess 551 concavely configured in a direction which the protuberant portion 550 protrudes, on an opposite surface to a surface on which the at least one protuberant portion 550 is disposed.

According to an embodiment, in the bridge punching process (case of FIG. 6C), a bridge may be punched to form the fixing member 540. According to an embodiment, in the barrel process, the fixing member 540 may be processed such that at least a part of at least one corner portion forms a curved surface which is curved. However, the disclosure is not limited thereto.

Figure 7:
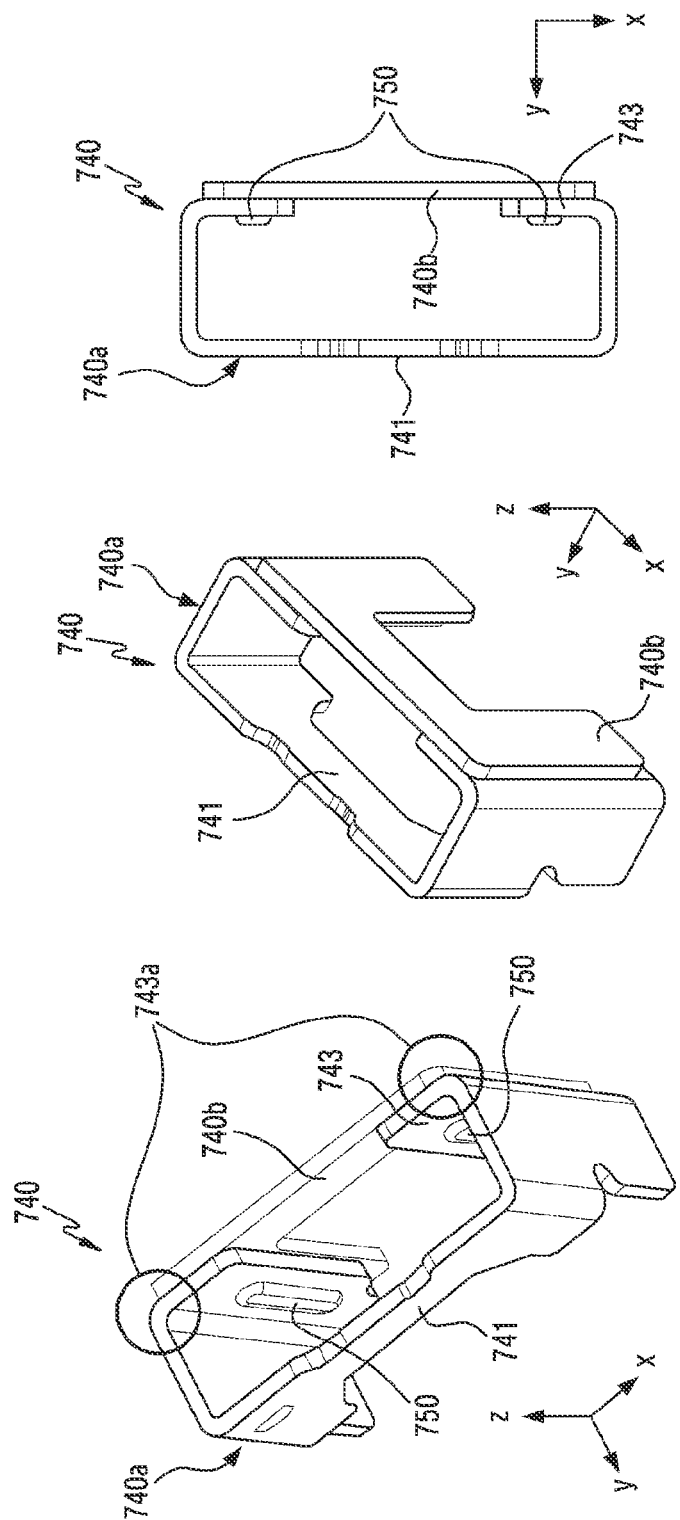
FIGS. 7A, 7B and 7C are perspective views and a plan view illustrating a fixing member according to another embodiment.

FIGS. 7A, 7B and 7C are perspective views and a plan view illustrating a fixing member 740 according to another embodiment.

Referring to FIGS. 7A, 7B and 7C, the fixing member 740 according to an embodiment may further include at least one reinforcement member 740b coupled to a fixing member 740a. The fixing member 740a may be referred to by the fixing member 140 of FIG. 1 and the fixing member 540 of FIGS. 5A to 6. For components that are the same or substantially the same as those described above, a redundant description will be omitted.

According to an embodiment, in a state in which a protrusion portion (e.g., the protrusion portion 120 of FIG. 1) and an electronic component (e.g., the electronic component 130 of FIG. 1) coupled to the protrusion portion 120 are fitted in the fixing member 740a, the fixing member 740a may receive an external force (or stimulus) of an electronic device (e.g., the electronic device 100 of FIG. 1). For example, the one or more second surfaces 743 may receive a force in a direction (a direction of an air or water pressure) (for example, the −y-axis direction) in which air or water is introduced by air pressure (pneumatic pressure) or water pressure (hydraulic pressure) introduced into the inside of the electronic device 100 from the outside of the electronic device 100 through a through-hole (e.g., the through-hole 122 of FIG. 1).

According to an embodiment, the one or more second surfaces 743 may be spaced apart from each other. When the one or more second surfaces 743 are spaced apart from each other, a shape or position of at least a partial region of the fixing member 740a may be changed by the above-mentioned external force. For example, the one or more second surfaces 743 may be pushed in the direction (for example, in the −y-axis direction) in which air or water is introduced by the external force. As a second surface 743 is pushed, a bending region 743a between a side surface and the second surface 743 may widen to the left and/or right (for example, the +x and/or −x-axis directions). As the bending region 743a widens, a fixing force of the fixing member 740a may be reduced. In order to prevent the one or more second surfaces 743 from being pushed or the bending region 743a from widening, the fixing member 740 may further include at least one reinforcement member 740b.

According to an embodiment, the at least one reinforcement member 740b may be disposed to face a first surface 741 of the fixing member 740a. For example, the at least one reinforcement member 740b may be disposed such that at least a part thereof faces the one or more second surfaces 743 of the fixing member 740a. When the one or more second surfaces 743 of the fixing member 740a are spaced apart, the at least one reinforcement member 740b may connect at least a part of the one or more second surfaces 743 that are spaced apart from each other. The at least one reinforcement member 740b connects the one or more second surfaces 743 that are spaced apart from each other so that the at least one reinforcement member 740b may be coupled to the fixing member 740a. The at least one reinforcement member 740b may be coupled to the fixing member 740a to distribute a force applied to the second surface 743.

Figure 8:
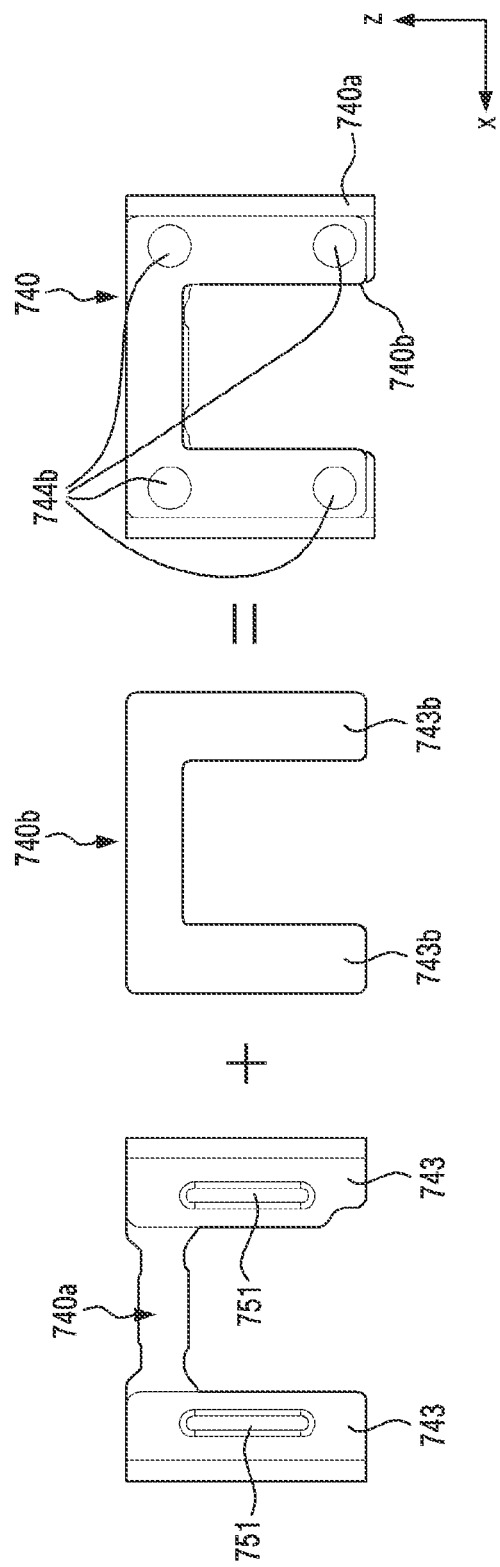
FIG. 8 is a combination of plan views illustrating a process of manufacturing a fixing member according to another embodiment.

FIG. 8 is a combination of plan views illustrating a process of manufacturing a fixing member 740 according to another embodiment.

The fixing member 740 may be referred to as being the same feature as the fixing member 140 of FIG. 1 and the fixing member 740 of FIGS. 7A, 7B and 7C. A fixing member 740a may be referred to by the fixing member 540 of FIGS. 5A to 6C. For components the same or substantially the same as those described above, a redundant description will be omitted.

Referring to FIG. 8, at least one reinforcement member 740b according to an embodiment may be coupled to the fixing member 740a. For example, at least a part of the at least one reinforcement member 740b may be coupled to at least one second surface 743 of the fixing member 740a.

According to an embodiment, the fixing member 740a may be coupled to the at least one reinforcement member 740b by a welding process or some other similar process. However, the disclosure is not limited thereto. For example, the fixing member 740a may be coupled to the at least one reinforcement member 740b by using an adhesive member (for example, tape, bond, or silicone). At least one region 744b of FIG. 8 may be a region in which welding is performed or a region to which an adhesive member is attached to be coupled to at least one second surface 743b of the fixing member 740a. However, the disclosure is not limited thereto.

Figure 9A:
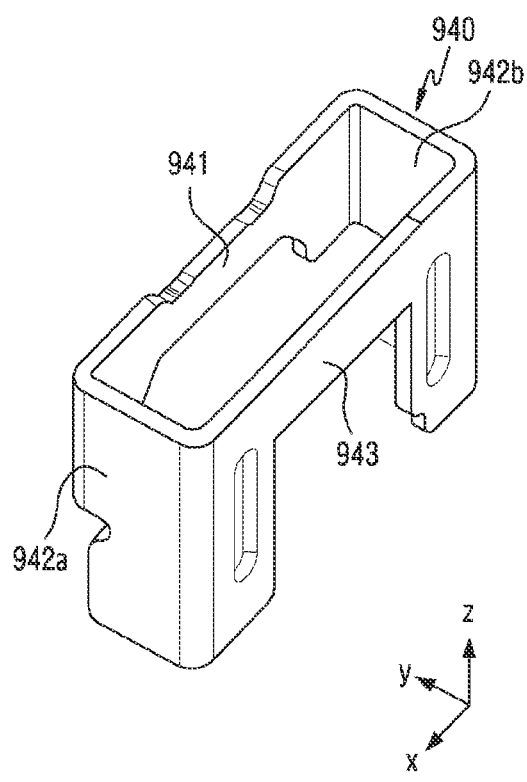
FIGS. 9A and 9B are perspective views illustrating a fixing member according to still another embodiment.
Figure 9B:
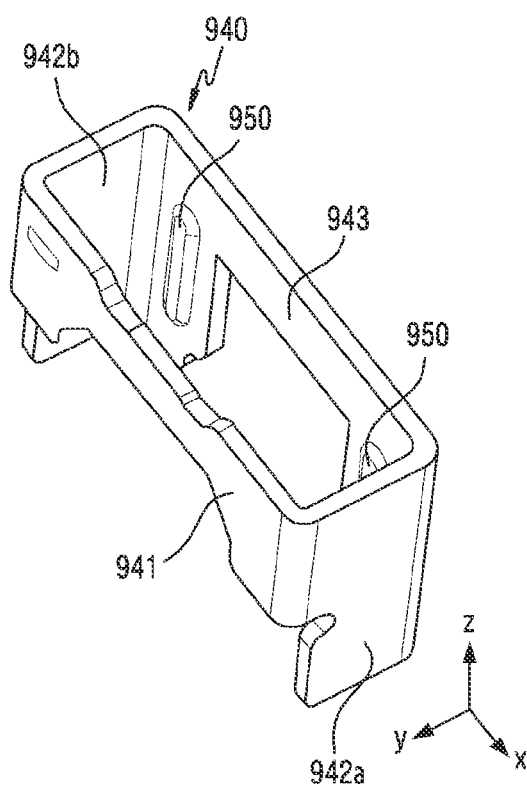

FIGS. 9A and 9B are perspective views illustrating a fixing member 940 according to still another embodiment.

The fixing member 940 may be referred to as being the same feature as the fixing member 140 of FIG. 1. For components the same or substantially the same as those described above, a redundant description will be omitted.

Referring to FIGS. 9A and 9B, at least a partial cross-section of the fixing member 940 according to an embodiment may form a closed figure including a first surface 941 and a second surface 943. For example, when the fixing member 940 is viewed from above (for example, in the −z-axis direction), the fixing member 940 may form a polygonal shape. According to an embodiment, when the fixing member 940 is viewed from above (for example, in the −z-axis direction), the fixing member 940 may have a rectangular shape. However, the disclosure is not limited thereto.

According to an embodiment, the fixing member 940 may include the first surface 941, the second surface 942 facing the first surface 941, a first side surface 942a connecting one end of the first surface 941 and one end of the second surface 942, and a second side surface 942b connecting the other end of the first surface 941 and the other end of the second surface 942 and facing the first side surface 942a. The fixing member 940 may be surrounded by the first surface 941, the second surface 942, the first side surface 942a, and the second side surface 942b to form a through-hole therein. A protrusion portion (e.g., the protrusion portion 120 of FIG. 1) and an electronic component (e.g., the electronic component 130 of FIG. 1) are inserted into the through-hole, so that the electronic component 130 may be fixed to the protrusion portion 120.

According to an embodiment, the fixing member 940 may be formed of a single member. For example, the first surface 941, the second surface 943, the first side surface 942a, and the second side surface 942b may be integrally configured. However, the disclosure is not limited thereto. In various embodiments, at least two of the first surface 941, the second surface 943, the first side surface 942a, or the second side surface 942b may be integrally configured.

FIGS. 10A and 10B are a plan view illustrating an electronic device 100 in which an electronic component 130 is coupled to a protrusion portion 120 and a plan view of the electronic device 100 to which a fixing member 1040 is coupled, according to an embodiment.

The electronic device 100 may be referred to as being the same feature as the electronic device 100 of FIG. 1. The fixing member 1040 may be referred to as being the same feature as the fixing member 140 of FIG. 1, the fixing member 540 of FIGS. 5 to 6, the fixing member 740 of FIGS. 7 to 8, and the fixing member 940 of FIG. 9. The same reference numerals are used for the same or substantially the same components as those described above, and a redundant description will be omitted.

The case of FIG. 10A may be a plan view of the electronic device 100 in which the electronic component 130 is coupled to the protrusion portion 120 according to an embodiment, as viewed in a direction (for example, the +y-axis direction) toward the outside from the inside. The case of FIG. 10B may be a plan view of the electronic device 100 to which the fixing member 1040 is coupled according to an embodiment, as viewed from above (for example, in the −z-axis direction).

Referring to the case of FIG. 10A, the electronic component 130 according to an embodiment may include a first surface 133 on which a second surface 1043 of the fixing member 1040 is disposed. At least a part of the first surface 133 may face at least a part of the second surface 1043.

According to an embodiment, in a state in which the protrusion portion 120 and the electronic component 130 are fitted in the fixing member 1040, at least one protuberant portion 1050 may be disposed in a direction (for example, the +y-axis direction) in which the second surface 1043 presses the electronic component 130 toward the protrusion portion 120.

According to an embodiment, the at least one protuberant portion 1050 of at least one second surface 1043 may face at least a partial region of the first surface 133 of the electronic component 130. Referring to the case of FIG. 10A, a first region 131a may be a region in which the at least one protuberant portion 1050 is disposed in a state in which the protrusion portion 120 and the electronic component 130 are fitted in the fixing member 1040 (see the case of FIG. 10B).

According to an embodiment, the fixing member 1040 includes the at least one protuberant portion 1050, so that the fixing member 1040 may provide for an interference fit structure. For example, the sum of widths in a first direction WA of the protrusion portion 120 and the electronic component 130 may be substantially equal to a width in the first direction WA between the protuberant portion 1050 and the first surface 1041 of the fixing member 1040. The fixing member 1040 includes the at least one protuberant portion 1050, so that the protuberant portion 1050 may adjust a width in the first direction WA of the fixing member 1040. The fixing member 1040 includes the at least one protuberant portion 1050, so that the protuberant portion 1050 may prevent a problem (for example, the width in the first direction WA of the fixing member 1040 is greater than the sum of the widths in the first direction WA of the protrusion portion 120 and the electronic component 130, a fixing force of the fixing member 1040 is reduced) caused by an error in the width in the first direction WA. This error can occur when the fixing member 1040 is manufactured, for example.

According to an embodiment, the electronic device 100 may further include at least one protection member 160 disposed between the at least one second surface 1043 and the first surface 133 of the electronic component 130 in a state in which the protrusion portion 120 and the electronic component 130 are fitted in the fixing member 1040 (see (b) of FIG. 10). When the protrusion portion 120 and the electronic component 130 are fitted in the fixing member 1040, the at least one protection member 160 may be disposed in a region where the at least one protuberant portion 1050 moves while facing the first surface 133. For example, the at least one protection member 160 may be disposed in the first region 131a. However, the disclosure is not limited thereto. The at least one protection member 160 may prevent damage (for example, a scratch) to the first surface 133 of the electronic component 130 by the at least one protuberant portion 1050 when the protrusion portion 120 and the electronic component 130 are fitted in the fixing member 1040.

According to an embodiment, the at least one protection member 160 may include a hard material. However, the disclosure is not limited thereto. For example, the at least one protection member 160 may include a material having elasticity such as rubber or silicone.

Figure 11:
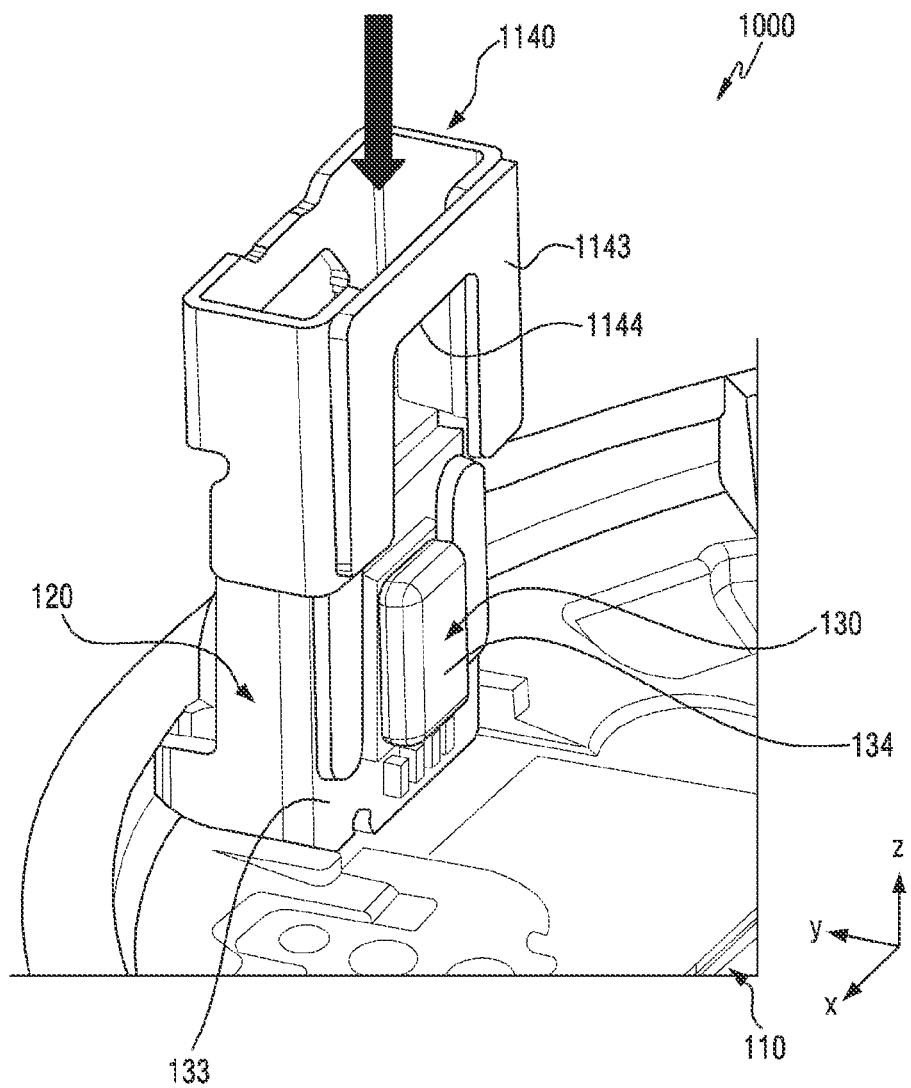
FIG. 11 is a perspective view illustrating a process in which a fixing member is coupled in a state in which an electronic component is coupled to a protrusion portion, according to an embodiment.

FIG. 11 is a perspective view illustrating a process in which a fixing member 1140 is coupled in a state in which an electronic component 130 is coupled to a protrusion portion 120 according to an embodiment.

An electronic device 1000 and the fixing member 1140 may be referred to by the electronic device 100 and the fixing member 140, 540, 740, 940, or 1040 of FIGS. 1A to 10B. The same reference numerals are used for the same or substantially the same components as those described above, and a redundant description will be omitted.

Referring to FIG. 11, the fixing member 1140 according to an embodiment may be fit in an opposite direction (for example, the −z-axis direction) to a direction in which the protrusion portion 120 protrudes. The fixing member 1140 may be configured to correspond to the shape of at least a part of the electronic component 130 in a state in which the protrusion portion 120 and the electronic component 130 are fitted. The electronic component 130 may include a protrusion structure 134 protruding from an opposite surface 133 of one surface on which a waterproof member (e.g., the waterproof member 131 of FIG. 1) is disposed. At least one second surface 1143 of the fixing member 1140 may have a shape corresponding to at least a part of the protrusion structure 134 in a state in which the protrusion portion 120 and the electronic component 130 are fitted. For example, referring to FIG. 11, the second surface 1143 may include a groove 1144 that is concavely configured in an opposite direction (for example, the +z-axis direction) to a direction in which the fixing member 1140 is fitted. However, the shape of the fixing member 1140 is not limited thereto.

According to an embodiment, when the fixing member 1140 includes at least one reinforcement member (e.g., the reinforcement member 740b of FIGS. 7A, 7B and 7C), the at least one reinforcement member 740b may be configured to correspond to a shape of at least a part of the electronic component 130 in a state in which the protrusion portion 120 and the electronic component 130 are fitted. The at least one reinforcement member 740b of the fixing member 1140 may have a shape corresponding to at least a part of the protrusion structure 134 in a state in which the protrusion portion 120 and the electronic component 130 are fitted. For example, the at least one reinforcement member 740b may include the groove 1144 that is concavely configured in an opposite direction (for example, the +z-axis direction) to a direction in which the fixing member 1140 is fitted. However, the shape of the fixing member 1140 is not limited thereto.

Figure 12:
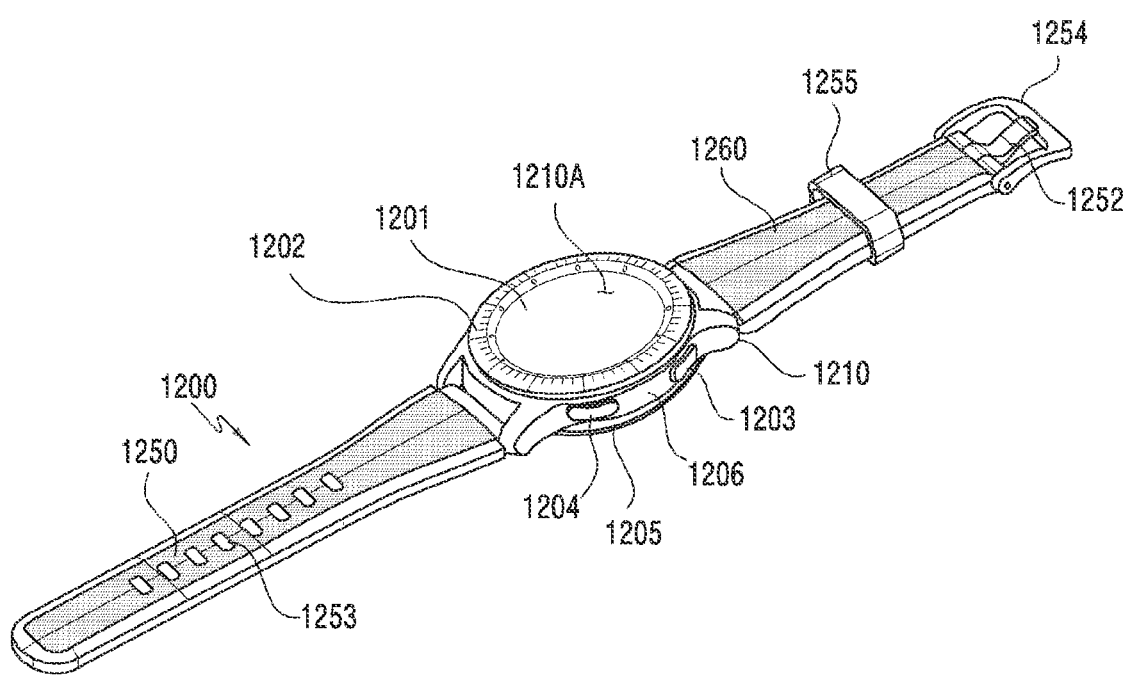
FIG. 12 is a perspective view of a front surface of a mobile electronic device according to an embodiment.
Figure 13:
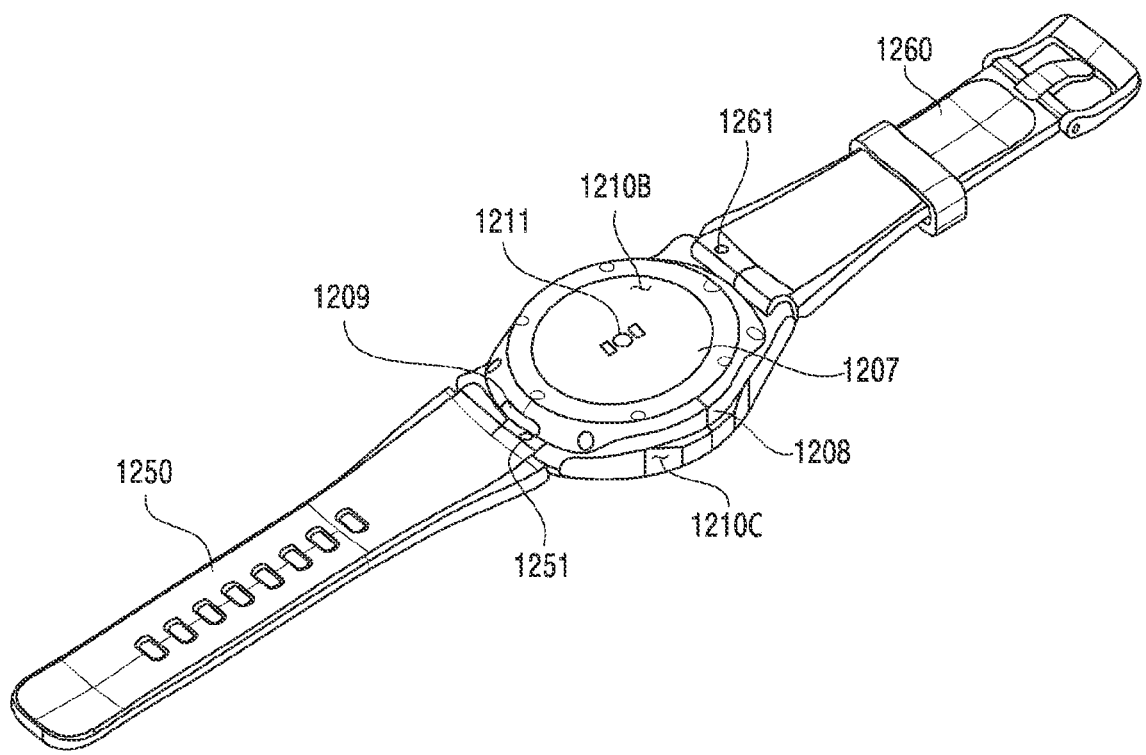
FIG. 13 is a perspective view of a rear surface of the electronic device of FIG. 12.

Referring to FIGS. 12 and 13, an electronic device 1200 according to an embodiment may include a housing 1210 including a first surface (or a front surface) 1210A, a second surface (or a rear surface) 1210B and a side surface 1210C surrounding a space between the first surface 1210A and the second surface 1210B. The electronic device 1200 further includes binding members 1250 and 1260 connected to at least a part of the housing 1210 and configured to detachably bind the electronic device 1200 to a part of a user's body a wrist or an ankle). In another embodiment (not shown), the housing may refer to a structure which configures a part of the first surface 1210A, the second surface 1210B and the side surface 1210C of FIG. 12. According to an embodiment, the first surface 1210A may include or be configured by a front plate 1201 (e.g., a glass plate or a polymer plate including various coating layers), at least a part of which is substantially transparent. The second surface 1210B may include or be configured by a rear plate 1207 which is substantially opaque. The rear plate 1207 may be formed of, for example, coated or colored glass, ceramic, a polymer, or a metal (e.g., aluminum, stainless steel (STS), or magnesium), or a combination of two or more of the above materials. The side surface 1210C may include or be configured by a side bezel structure (or a "side member") 1206 that is coupled to the front plate 1201 and the rear plate 1207 and that includes a metal and/or a polymer. In some embodiments, the rear plate 1207 and the side bezel structure 1206 may be integrally configured and may include the same material (e.g., a metal material such as aluminum). The binding members 1250 and 1260 may be configured to have various materials and shapes. A woven fabric, leather, rubber, urethane, metal, ceramic, or a combination of at least two of the above materials may be used to form an integrated unit link and a plurality of unit links to be movable with respect to each other.

According to an embodiment, the electronic device 1200 may include at least one of a display 1220 (see FIG. 14), audio modules 1205 and 1208, a sensor module 1211, key input devices 1202, 1203 and 1204 and a connector hole 1209. In some embodiments, the electronic device 1200 may not include at least one (e.g., the key input devices 1202, 1203 and 1204, the connector hole 1209, or the sensor module 1211) of the components or may additionally include another component.

For example, the display 1220 may be exposed through a significant part of the front plate 1201. The shape of the display 1220 may be a shape corresponding to the shape of the front plate 1201, and may have various shapes such as a circle, an oval, or a polygon. The display 1220 may be coupled to or disposed adjacent to a touch detection circuit, a pressure sensor capable of measuring the intensity (pressure) of a touch, and/or a fingerprint sensor.

The audio modules 1205 and 1208 may include a microphone hole 1205 and a speaker hole 1208. The microphone hole 1205 may include a microphone disposed therein to acquire external sound, and in some embodiments, multiple microphones may be disposed therein to detect the direction of sound. The speaker hole 1208 may be used as an external speaker and a receiver for calls. In some embodiments, speaker holes 1208 and 1214 and the microphone hole 1205 may be implemented as a single hole, or a speaker may be included without the speaker holes 1208 and 1214 (e.g., a piezo speaker).

The sensor module 1211 may generate an electrical signal or a data value corresponding to an internal operating state of the electronic device 1200 or an external environment state. The sensor module 1211 may include, for example, a biometric sensor module 1211 (e.g., an HRM sensor) disposed on the second surface 1210B of the housing 1210. The electronic device 1200 may further include a sensor module which is not illustrated, for example, at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The key input devices 1202, 1203 and 1204 may include a wheel key 1202 disposed on the first surface 1210A of the housing 1210 and rotatable in at least one direction, and/or side key buttons 1202 and 1203 disposed on the side surface 1210C of the housing 1210. The wheel key may have a shape corresponding to the shape of the front plate 1202. In another embodiment, the electronic device 1200 may not include some or all of the above-mentioned key input devices 1202, 1203, and 1204, and the key input devices 1202, 1203, and 1204, which are not included therein, may be implemented in another form such as a soft key on the display 1220.

The connector hole 1209 may include another connector hole (not shown) which can receive a connector (for example, a USB connector) for transmitting or receiving power and/or data to or from an external electronic device, and receive a connector for transmitting or receiving an audio signal to or from an external electronic device. The electronic device 1200 may further include, for example, a connector cover (not shown) which covers at least a part of the connector hole 1209 and blocks the introduction of foreign substances into the connector hole.

The binding members 1250 and 1260 may be detachably bound to at least a partial region of the housing 1210 by using locking members 1251 and 1261. The binding members 1250 and 1260 may include one or more of a fixing member 1252, a fixing member fastening hole 1253, a band guide member 1254, and a band fixing ring 1255.

The fixing member 1252 may be configured to fix the housing 1210 and the binding members 1250 and 1260 to a part of a user's body (e.g., a wrist, an ankle, etc.). The fixing member fastening hole 1253 may correspond to the fixing member 1252 to fix the housing 1210 and the binding members 1250 and 1260 to a part of the user's body. The hand guide member 1254 is configured to limit a range of movement of the fixing member 1252 when the fixing member 1252 is fastened to the fixing member fastening hole 1253, so that the binding members 1250 and 1260 may be in close contact with a part of a user's body to be bound. The band fixing ring 1255 may limit a range of movement of the binding members 1250 and 1260 in a state in which the fixing member 1252 and the fixing member fastening hole 1253 are fastened to each other.

Figure 14:
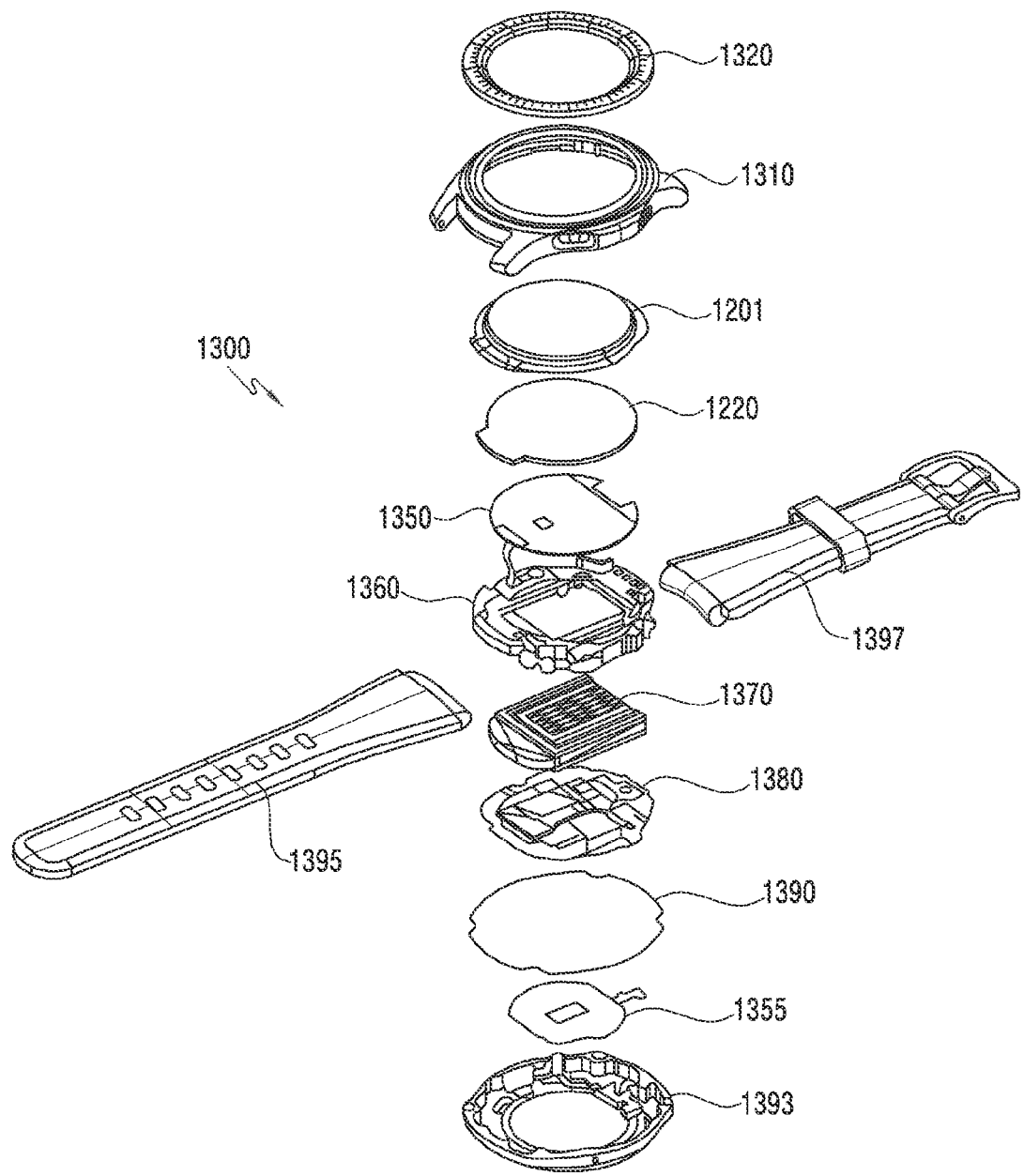
FIG. 14 is an exploded perspective view of the electronic device of FIG. 12.

Referring to FIG. 14, an electronic device 1300 may include a side bezel structure 1310, a wheel key 1320, a front plate 1201, a display 1220, a first antenna 1350, a second antenna 1355, a support member 1360 (e.g., a bracket), a battery 1370, a printed circuit board 1380, a sealing member 1390, a rear plate 1393 and binding members 1395 and 1397. At least one of the components of the electronic device 1300 may be the same as or similar to at least one of the components of the electronic device 1200 of FIG. 12 or 13 and a redundant description thereof is omitted below. The support member 1360 may be disposed inside the electronic device 1300 to be connected to the side bezel structure 1310 or to be configured integrally with the side bezel structure 1310. The support member 1360 may be made of, for example, a metal material and/or a non-metal (e.g., polymer) material. The support member 1360 may have one surface to which the display 1220 is coupled, and the other surface to which the printed circuit board 1380 is coupled. The printed circuit board 1380 may include a processor, a memory, and/or an interface mounted thereon. The processor may include, for example, one or more of a central processing unit, an application processor, a graphic processing unit (GPU), an application processor sensor processor, or a communication processor.

The memory may include, for example, a volatile memory or a nonvolatile memory. The interface may include, for example, a high-definition multimedia interface (HDMI), a universal serial bus (USB) interface, an SD card interface, and/or an audio interface. For example, the interface may electrically or physically connect the electronic device 1300 to an external electronic device and include a USB connector, an SD card/MMC connector, or an audio connector.

The battery 1370 is a device for supplying power to at least one component of the electronic device 1300 and may include, for example, a non-rechargeable primary cell, a rechargeable secondary cell, or a fuel cell. For example, at least a part of the battery 1370 may be disposed substantially on the same plane as the printed circuit board 1380. The battery 1370 may be integrally disposed inside the electronic device 1200 or may be disposed to be detachable from the electronic device 1200.

The first antenna 1350 may be disposed between the display 1220 and the support member 1360. The first antenna 1350 may include, for example, a near field communication (NFC) antenna, a wireless charging antenna, and/or a magnetic secure transmission (MST) antenna. For example, the first antenna 1350 may perform short-range communication with an external device or wirelessly transmit/receive power required for charging, and transmit a magnetic-based signal including a short-range communication signal or payment data. In another embodiment, an antenna structure may be configured by a part of the side bezel structure 1310 and/or the support member 1360 or a combination thereof.

The second antenna 1355 may be disposed between the circuit board 1380 and the rear plate 1393. The second antenna 1355 may include, for example, a near field communication (NFC) antenna, a wireless charging antenna, and/or a magnetic secure transmission (MST) antenna. For example, the second antenna 1355 may perform short-range communication with an external device or wirelessly transmit/receive power required for charging, and transmit a magnetic-based signal including a short-range communication signal or payment data. In another embodiment, an antenna structure may be configured by a part of the side bezel structure 1310 and/or the rear plate 1393 or a combination thereof.

The sealing member 1390 may be positioned between the side bezel structure 1310 and the rear plate 1393. The sealing member 1390 may be configured to block moisture and foreign substances from being introduced into a space surrounded by the side bezel structure 1310 and the rear plate 1393 from the outside.

As described above, an electronic device according to an embodiment may include a housing including a protrusion portion protruding in one direction, and an opening portion communicating from the outside of the electronic device to the inside of the electronic device on one surface of the protrusion portion, an electronic component including a waterproof member disposed to shield the opening portion, and a fixing member including a first surface disposed on an opposite surface to the one surface of the protrusion portion on which the opening portion is configured, and at least one second surface extending from one side of the first surface to face the first surface, wherein the fixing member is disposed such that the waterproof member is forced against the opening portion by the first surface and the at least one second surface, by fitting the protrusion portion and the electronic component between the first surface and the at least one second surface in a state in which the electronic component is coupled to the protrusion portion such that the waterproof member shields the opening portion.

According to an embodiment, the protrusion portion may include at least one catch member disposed to fix at least a part of the fixing member to the opposite surface of the protrusion portion in a state of being fitted between the first surface and the at least one second surface of the fixing member.

According to an embodiment, the at least one catch member may include a projection protruding from the opposite surface of the protrusion portion toward a direction different from a direction in which the protrusion portion protrudes.

According to an embodiment, the fixing member may include at least one first groove concavely configured in an opposite direction to a direction in which the protrusion portion protrudes on at least a part of the first surface, to receive at least a part of the at least one catch member.

According to an embodiment, the protrusion portion may include a first protrusion structure protruding from the opposite surface to the one surface on which the opening portion is configured, and the fixing member may include a second groove concavely configured to correspond to at least a part of the first protrusion structure in a state in which the protrusion portion and the electronic component are fitted between the first surface and the at least one second surface.

According to an embodiment, the electronic component may include at least one of a sound module or a camera module.

According to an embodiment, at least a part of the one surface of the protrusion portion may face at least a part of one surface of the electronic component on which the waterproof member is disposed, and the at least a part of the one surface of the protrusion portion may be coupled to the one surface of the electronic component by using an adhesive member.

According to an embodiment, the fixing member of the electronic device may further include at least one reinforcement member disposed to connect at least a part of the at least one second surface.

According to an embodiment, the electronic component may include a second protrusion structure protruding from an opposite surface to a surface on which the waterproof member is disposed, and the at least one reinforcement member may include a groove concavely configured to correspond to at least a part of the second protrusion structure in a state in which the protrusion portion and the electronic component are fitted between the first surface and the at least one second surface of the fixing member.

According to an embodiment, the at least one reinforcement member may be coupled to the at least a part of the at least one second surface by using welding or an adhesive member.

According to an embodiment, the fixing member may include at least one protuberant portion configured in a direction in which the at least one second surface presses the electronic component toward the protrusion portion in a state in which the protrusion portion and the electronic component are fitted in the fixing member.

According to an embodiment, the electronic device may further include at least one protection member disposed in a region in which the at least one protuberant portion moves while facing at least a part of at least one surface of the electronic component when the protrusion portion and the electronic component are fitted in the fixing member.

As described above, an electronic device according to an embodiment may include a housing including a protrusion portion protruding in one direction, and an opening portion communicating from the outside of the electronic device to the inside of the electronic device on one surface of the protrusion portion, an electronic component including a waterproof member disposed to shield the opening portion, and a fixing member which includes a first surface disposed on an opposite surface to the one surface of the protrusion portion on which the opening portion is configured, and a second surface extending from the first surface and disposed on an opposite surface to a surface on which the waterproof member of the electronic component is disposed, to face the first surface, and of which at least a partial cross-section forms a closed figure including the first surface and the second surface, wherein the fixing member is disposed such that the waterproof member is forced against the opening portion by the first surface and the second surface, by fitting the protrusion portion and the electronic component inside the closed figure in a coupled state.

According to an embodiment, the protrusion portion may include at least one catch member disposed to fix at least a part of the fixing member to the opposite surface of the protrusion portion in a state of being fitted between the first surface and the second surface of the fixing member.

According to an embodiment, the at least one catch member may include a projection protruding from the opposite surface of the protrusion portion toward a direction different from a direction in which the protrusion portion protrudes.

According to an embodiment, the fixing member may include at least one first groove concavely configured in an opposite direction to a direction in which the protrusion portion protrudes on at least a part of the first surface, to receive at least a part of the at least one catch member.

According to an embodiment, the protrusion portion may include a first protrusion structure protruding from the opposite surface to the one surface on which the opening portion is configured, and the fixing member may include a second groove concavely configured to correspond to at least a part of the first protrusion structure in a state in which the protrusion portion and the electronic component are fitted between the first surface and the second surface.

According to an embodiment, the electronic component may include a second protrusion structure protruding from an opposite surface to one surface on which the waterproof member is disposed, and the fixing member may include a groove concavely configured to correspond to at least a part of the second protrusion structure in a state in which the protrusion portion and the electronic component are fitted between the first surface and the second surface.

According to an embodiment, the fixing member may include at least one protuberant portion configured in a direction in which the second surface presses the electronic component toward the protrusion portion in a state in which the protrusion portion and the electronic component are fitted in the fixing member.

According to an embodiment, the electronic device may further include at least one protection member disposed in a region in which the at least one protuberant portion moves while facing at least a part of at least one surface of the electronic component when the protrusion portion and the electronic component are fitted in the fixing member.

What is claimed is:

1. An electronic device comprising:
   a housing comprising: a protrusion portion and an opening portion formed at a surface of the protrusion portion;
   an electronic component comprising a waterproof member disposed to shield the opening portion; and
   a fixing member disposed on a part of outer parts of the protrusion portion and the electronic component in a state in which the electronic component is coupled to the protrusion portion, the fixing member comprising:
   a first surface disposed on an opposite surface to one surface of the protrusion portion; and a second surface extending from the first surface and facing the first surface,
wherein the fixing member is disposed such that the waterproof member is forced against the opening portion by the first surface and the second surface by fitting the protrusion portion and the electronic component between the first surface and the second surface in the state in which the electronic component is coupled to the protrusion portion such that the waterproof member shields the opening portion.

2. The electronic device of claim 1, wherein the protrusion portion comprises at least one catch member disposed to fix at least a part of the fixing member to the opposite surface of the protrusion portion in a state of being fitted between the first surface and the second surface of the fixing member.

3. The electronic device of claim 2, wherein the at least one catch member comprises a projection protruding from the opposite surface of the protrusion portion toward a direction which is different from a direction in which the protrusion portion protrudes.

4. The electronic device of claim 2, wherein the fixing member comprises at least one first groove concavely configured in an opposite direction to a direction in which the protrusion portion protrudes on at least a part of the first surface to receive at least a part of the at least one catch member.

5. The electronic device of claim 1, wherein:
the protrusion portion comprises a first protrusion structure protruding from the opposite surface to the surface of the protrusion portion on which the opening portion is configured, and
the fixing member comprises a second groove concavely configured to correspond to at least a part of the first protrusion structure in a state in which the protrusion portion and the electronic component are fitted between the first surface and the second surface.

6. The electronic device of claim 1, wherein the electronic component comprises at least one of a sound module or a camera module.

7. The electronic device of claim 1, wherein:
at least a part of the ese-surface of the protrusion portion faces at least a part of a surface of the electronic component on which the waterproof member is disposed, and
the at least a part of the one-surface of the protrusion portion is coupled to the surface of the electronic component by using an adhesive member.

8. The electronic device of claim 1, further comprising at least one reinforcement member disposed to connect at least a part of the second surface.

9. The electronic device of claim 8, wherein:
the electronic component comprises a second protrusion structure protruding from an opposite surface to a surface on which the waterproof member is disposed, and
the at least one reinforcement member comprises a groove concavely configured to correspond to at least a part of the second protrusion structure in a state in which the protrusion portion and the electronic component are fitted between the first surface and the second surface of the fixing member.

10. The electronic device of claim 8, wherein the at least one reinforcement member is coupled to the at least a part of the second surface by using welding or an adhesive member.

11. The electronic device of claim 1, wherein the fixing member comprises at least one protuberant portion configured in a direction in which the second surface presses the electronic component toward the protrusion portion in a state in which the protrusion portion and the electronic component are fitted in the fixing member.

12. The electronic device of claim 11, further comprising at least one protection member disposed in a region in which the at least one protuberant portion moves while facing at least a part of at least one surface of the electronic component when the protrusion portion and the electronic component are fitted in the fixing member.

13. An electronic device comprising:
a housing comprising a protrusion portion and an opening portion formed at a surface of the protrusion portion;
an electronic component comprising a waterproof member disposed to shield the opening portion; and
a fixing member disposed on a part of outer parts of the protrusion portion and the electronic component in a coupled state in which the electronic component is coupled to the protrusion portion, the fixing member comprising:
a first surface disposed on an opposite surface to the surface of the protrusion portion; and
a second surface extending from the first surface and disposed on an opposite surface to a surface on which the waterproof member of the electronic component is disposed, to face the first surface, and of which at least a partial cross-section forms a closed figure comprising the first surface and the second surface,
wherein the fixing member is disposed such that the waterproof member is forced against the opening portion by the first surface and the second surface, by fitting the protrusion portion and the electronic component inside the closed figure in the coupled state.

14. The electronic device of claim 13, wherein the protrusion portion comprises at least one catch member disposed to fix at least a part of the fixing member to the opposite surface of the protrusion portion in a state of being fitted between the first surface and the second surface of the fixing member.

15. The electronic device of claim 14, wherein the at least one catch member comprises a projection protruding from the opposite surface of the protrusion portion toward a direction different from a direction in which the protrusion portion protrudes.

16. The electronic device of claim 14, wherein the fixing member comprises at least one first groove concavely configured in an opposite direction to a direction in which the protrusion portion protrudes on at least a part of the first surface, to receive at least a part of the at least one catch member.

17. The electronic device of claim 13, wherein the protrusion portion comprises a protrusion structure protruding from the opposite surface to the surface on which the opening portion is configured, and
the fixing member comprises a second groove concavely configured to correspond to at least a part of the protrusion structure in a state in which the protrusion portion and the electronic component are fitted between the first surface and the second surface.

18. The electronic device of claim 13, wherein the electronic component comprises a second protrusion structure protruding from an opposite surface to the surface on which the waterproof member is disposed, and
the fixing member comprises a groove concavely configured to correspond to at least a part of the second protrusion structure in a state in which the protrusion portion and the electronic component are fitted between the first surface and the second surface.

19. The electronic device of claim 13, wherein the fixing member comprises at least one protuberant portion configured in a direction in which the second surface presses the electronic component toward the protrusion portion in a state in which the protrusion portion and the electronic component are fitted in the fixing member.

20. The electronic device of claim 19, further comprising at least one protection member disposed in a region in which the at least one protuberant portion moves while facing at least a part of at least one surface of the electronic component when the protrusion portion and the electronic component are fitted in the fixing member.

* * * * *